United States Patent
Islam et al.

(10) Patent No.: US 10,425,922 B2
(45) Date of Patent: Sep. 24, 2019

(54) COMMUNICATION OF UPLINK CONTROL INFORMATION

(71) Applicant: QUALCOMM Incorporated, San Diego, CA (US)

(72) Inventors: Muhammad Nazmul Islam, Edison, NJ (US); Sundar Subramanian, Bridgewater, NJ (US); Ashwin Sampath, Skillman, NJ (US); Juergen Cezanne, Ocean Township, NJ (US); Bilal Sadiq, Basking Ridge, NJ (US); Junyi Li, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/242,153

(22) Filed: Aug. 19, 2016

(65) Prior Publication Data
US 2017/0245259 A1    Aug. 24, 2017

Related U.S. Application Data

(60) Provisional application No. 62/297,863, filed on Feb. 20, 2016, provisional application No. 62/314,959, (Continued)

(51) Int. Cl.
*H04W 4/00* (2018.01)
*H04W 72/04* (2009.01)
(Continued)

(52) U.S. Cl.
CPC ...... *H04W 72/0413* (2013.01); *H04B 7/0617* (2013.01); *H04B 7/0619* (2013.01);
(Continued)

(58) Field of Classification Search
CPC ... H04W 72/043; H04W 28/04; H04W 72/04; H04L 5/0048
See application file for complete search history.

(56) References Cited

U.S. PATENT DOCUMENTS 7,096,274 B1 * 8/2006 Ci .................. H04L 1/0007
370/333
9,173,209 B2 10/2015 Prakash et al.
(Continued)

FOREIGN PATENT DOCUMENTS

EP    2228933 A1    9/2010
WO    WO-2010148319 A1    12/2010
(Continued)

OTHER PUBLICATIONS

"3rd Generation Partnership Project; Technical Specification Group Radio Access Network; Evolved Universal Terrestrial Radio Access (E-UTRA); Physical layer procedures (Release 12)", 3GPP Standard; 3GPP TS 36.213, 3rd Generation Partnership Project (3GPP), Mobile Competence Centre ; 650, Route Des Lucioles ; F-06921 Sophia-Antipolis Cedex; France, vol. RAN WG1, No. V12.8.0, XP051047403, Dec. 9, 2015 [Dec. 9, 2015], pp. 6-165.
(Continued)

*Primary Examiner* — Stephen M D'Agosta
(74) *Attorney, Agent, or Firm* — Loza & Loza, LLP; Clint R. Morin

(57) ABSTRACT

Various aspects of the disclosure relate to communicating uplink control information. As one example, a user equipment may send uplink control information to a base station. In some aspects, the number of symbols used to communicate the uplink control information may be based on a link gain associated with the UE and/or based on a payload size of the uplink control information. As another example, the user equipment may send channel information for a number of beams to the base station. In some aspects, the number of
(Continued)

US 10,425,922 B2

Page 2 beams may be based on the type of channel that is used to send the uplink control information.

15 Claims, 35 Drawing Sheets

Related U.S. Application Data filed on Mar. 29, 2016, provisional application No. 62/327,436, filed on Apr. 25, 2016.

(51) Int. Cl.
| H04B 7/06 | (2006.01) |
|---|---|
| H04B 7/08 | (2006.01) |
| H04L 1/00 | (2006.01) |
| H04L 5/00 | (2006.01) |

(52) U.S. Cl.
CPC ......... *H04B 7/0645* (2013.01); *H04B 7/0695* (2013.01); *H04B 7/086* (2013.01); *H04L 1/003* (2013.01); *H04L 1/0004* (2013.01); *H04L 5/006* (2013.01); *H04L 5/0023* (2013.01); *H04L 5/0048* (2013.01); *H04L 5/0053* (2013.01); *H04L 5/0057* (2013.01)

(56) References Cited

U.S. PATENT DOCUMENTS

| 9,736,848 | B2* | 8/2017 | Kim | H04W 72/048 |
|---|---|---|---|---|
| 2004/0147287 | A1* | 7/2004 | Nelson, Jr. | H01Q 3/26 455/561 |
| 2006/0056345 | A1 | 3/2006 | Marinier et al. | |
| 2009/0016295 | A1* | 1/2009 | Li | H04L 5/0007 370/330 |
| 2010/0118730 | A1* | 5/2010 | Tanaka | H04L 1/0028 370/252 |
| 2010/0157826 | A1* | 6/2010 | Yu | H04B 7/155 370/252 |
| 2010/0262410 | A1* | 10/2010 | Harbour | G06F 11/261 703/13 |
| 2010/0309857 | A1* | 12/2010 | Kawamura | H04J 13/0059 370/329 |
| 2011/0066738 | A1* | 3/2011 | Richardson | H04W 72/02 709/229 |
| 2011/0244893 | A1* | 10/2011 | Wang | H04W 68/025 455/458 |
| 2011/0249637 | A1 | 10/2011 | Hammarwall et al. | |
| 2012/0051265 | A1 | 3/2012 | Shen et al. | |
| 2012/0147857 | A1* | 6/2012 | Wu | H04W 74/002 370/336 |
| 2013/0083729 | A1 | 4/2013 | Xu et al. | |
| 2013/0083757 | A1* | 4/2013 | Kakishima | H04B 7/0417 370/329 |
| 2013/0163544 | A1 | 6/2013 | Lee et al. | |
| 2013/0194988 | A1* | 8/2013 | Kubota | H04W 52/0216 370/311 |
| 2013/0223251 | A1 | 8/2013 | Li et al. | |
| 2014/0056378 | A1 | 2/2014 | Harel et al. | |
| 2014/0211731 | A1 | 7/2014 | Inoue et al. | |
| 2015/0003263 | A1 | 1/2015 | Senarath et al. | |
| 2015/0043465 | A1 | 2/2015 | Ouchi | |
| 2017/0245260 | A1 | 8/2017 | Islam et al. | |

FOREIGN PATENT DOCUMENTS

| WO | WO-2011103367 A1 | 8/2011 |
|---|---|---|
| WO | WO-2015109153 A1 | 7/2015 |

OTHER PUBLICATIONS

CATT: "System Analysis on TTI Shortening," 3GPP TSG RAN WG1 #83, R1-156613, Anaheim, CA, USA, XP051042078, Nov. 15-22, 2015, 8 pages. Retrieved from the Internet: URL: http://www.3gpp.org/ftp/tsg_ran/WG1_RL1/TSGR1_83/Docs/ [retrieved on Nov. 15, 2015].

International Search Report and Written Opinion—PCT/US2017/014442—ISA/EPO—dated Jun. 23, 2017.

"3 Generation Partnership Project, Technical Specification Group Radio Access Network, Evolved Universal Terrestrial Radio Access (E-UTRA), Physical layer procedures (Release 13)", 3GPP Standard, 3gpp TS 36.213, 3rd Generation Partnership Project (3gpp), Mobile Competence Centre, 650, Route Des Lucioles, F-96921, Sophia-Antipolis, Cedex, France, vol. RAN WG1, No. V13.0.0, Jan. 5, 2016, pp. 7-224, XP051047450.

Huawei., et al., "Short TTI for DL Transmissions", 3GPP TSG RAN WG1, Meeting #84, St Julian's, Malta, R1-160292, Feb. 15-19, 2016, 7 pgs, XP051053632, Retrieved from the Internet : URL : http://www.3gpp.org/ftp/Meetings_3GPP_SYNC/RAN1/Docs/ [retrieved on Feb. 14, 2016].

Nokia Networks: "CSI Types and Reporting Modes Design for FD-MIMO", 3GPP Draft, R1-154521, CSI Types and Reporting Modes Final, 3rd Generationpartnership Project (3GPP), Mobile Competence Centre, 650, Route Des Lucioles, F-06921 Sophia-Antipolis Cedex, France, vol. RAN WG1, No. Beijing, China, Aug. 24, 2015-Aug. 28, 2015, Aug. 23, 2015 (Aug. 23, 2015), XP051001792, Retrieved from the Internet: URL: http://www.3gpp.org/ftp/Meetings_3GPP_SYNC/RAN1/Docs/ [retrieved on Aug. 23, 2015].

Partial International Search Report—PCT/US2017/014442—ISA/EPO—dated Mar. 20, 2017.

Qualcomm Incorporated: "Discussion on Beam formed CSI-RS and Feedback Enhancements", 3GPP Draft, R1-153455, 3rd Generation Partnership Project (3gpp), Mobile Competence Centre, 650, Route Des Lucioles, F-96921, Sophia-Antipolis Cedex, France, vol. RAN WG1, No. Fukuoka, Japan, 29159525-29159529, Jun. 1, 2015, XP050978426, 234 pages. Retrieved from the Internet: URL:http://www.3gpp.org/ftp/tsg_ran/WG1 RL1/TSGR1 81/Docs/.

ZTE: "CSI Types and Reporting Modes for FD-MIMO", 3GPP Draft, R1-155273, CSI Types and Reporting Modes for FD-MIMO, 3rd Generation Partnership Project (3gpp), Mobile Competence Centre, 650, Route Des Lucioles, F-96921 Sophia-Antipolis Cedex, France, vol. RAN WG1, No. Malmo, Sweden, Oct. 5, 2015-Oct. 9, 2015, Oct. 4, 2015, XP051002232, 5 pages. Retrieved from the Internet: URL:http://www.3gpp.org/ftp/Meetings3GPPSYNC/RAN1/DOCS/.

ZTE: "Discussion on CSI Measurement and Feedback Related Configurations", 3GPP Draft, R1-155260 Discussion on CSI Measurement and Feedback Related Configurations, 3rd Generation Partnership Project (3gpp), Mobile Competence Centre, 650, Route Des Lucioles, F-06921 Sophia, vol. RAN WG1, No. Malmo, Sweden, Oct. 5, 2015-Oct. 9, 2015, Oct. 4, 2015, XP051002219, 5 pages. Retrieved from the Internet: URL:http://www.3gpp.org/ftp/Meetings_3GPP_SYNC/RAN1/Docs/.

* cited by examiner

COMMUNICATION OF UPLINK CONTROL INFORMATION

CROSS-REFERENCE TO RELATED APPLICATION(S)

This application claims priority to and the benefit of provisional patent application No. 62/297,863 filed in the U.S. Patent and Trademark Office on Feb. 20, 2016, provisional patent application No. 62/314,959 filed in the U.S. Patent and Trademark Office on Mar. 29, 2016, and provisional patent application No. 62/327,436 filed in the U.S. Patent and Trademark Office on Apr. 25, 2016, the entire content of each of which is incorporated herein by reference.

INTRODUCTION

Various aspects described herein relate to wireless communication and, more particularly but not exclusively, to communicating uplink control information.

In some multiple access wireless communication systems, several devices communicate with a base station. In some scenarios, the base station is equipped with multiple transmit antennas and multiple receive antennas. One example is a millimeter wave (mmW) system where multiple antennas are used for beamforming (e.g., in the range of 30 GHz, 60 GHz, etc.). Such a base station may communicate with the devices in a time-division-multiplexing (TDM) or time-division-duplexing (TDD) manner That is, the base station transmits to a first device in a first time interval and then to a second device subsequently in a second time interval. Often, the beamforming directions to these two devices are distinct. As a result, the base station may change its beamforming setting from the first time interval to the second time interval.

FIG. 1 illustrates a communication system 100 where a mmW base station (BS) 102 communicates with a first mmW user equipment (UE) 104 and a second mmW UE 106 via different beamforming directions. As indicated by a set of beams 108, the mmW base station 102 may communicate via any one of a plural of directional beams. As indicated by a set of beams 110, the first mmW UE 104 may communicate via any one of a plural of directional beams. As indicated by a set of beams 112, the second mmW UE 106 may communicate via any one of a plural of directional beams. For example, the base station 102 may communicate with the first mmW UE 104 via a first beamforming direction 114 and communicate with the second mmW UE 106 via a second beamforming direction 116.

In millimeter wave systems, it is desirable for uplink (UL) receive (RX) beamforming that is used to receive a sounding reference signal (SRS) to be UE-specific. In this way, a base station may obtain a more accurate estimate of the channel between the UE and the base station. On the other hand, UL RX beamforming to receive channel quality information (CQI), ACK/NAK, a scheduling request (SR), etc., does not have to be UE-specific. Moreover, an SR can come from UEs located in any angular region. If a base station performs UE-specific UL RX beamforming to receive SRS, the base station might not receive an SR from UEs that are located in a different angular region in the same symbol.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides an apparatus configured for communication that includes a memory device and a processing circuit coupled to the memory device. The processing circuit is configured to: determine a quantity of symbols to communicate uplink control information, wherein the quantity of symbols is based on a link gain of a user equipment (UE); and communicate the uplink control information using the determined quantity of symbols.

Another aspect of the disclosure provides a method for communication including: determining a quantity of symbols to communicate uplink control information, wherein the quantity of symbols is based on a link gain of a user equipment (UE); and communicating the uplink control information using the determined quantity of symbols.

Another aspect of the disclosure provides an apparatus configured for communication. The apparatus including: means for determining a quantity of symbols to communicate uplink control information, wherein the quantity of symbols is based on a link gain of a user equipment (UE); and means for communicating the uplink control information using the determined quantity of symbols.

Another aspect of the disclosure provides a non-transitory computer-readable medium storing computer-executable code, including code to: determine a quantity of symbols to communicate uplink control information, wherein the quantity of symbols is based on a link gain of a user equipment (UE); and communicate the uplink control information using the determined quantity of symbols.

In one aspect, the disclosure provides an apparatus configured for communication that includes a memory device and a processing circuit coupled to the memory device. The processing circuit is configured to: determine a quantity of symbols to communicate uplink control information, wherein the quantity of symbols is based on a payload size of the uplink control information; and communicate the uplink control information using the determined quantity of symbols.

Another aspect of the disclosure provides a method for communication including: determining a quantity of symbols to communicate uplink control information, wherein the quantity of symbols is based on a payload size of the uplink control information; and communicating the uplink control information using the determined quantity of symbols.

Another aspect of the disclosure provides an apparatus configured for communication. The apparatus including: means for determining a quantity of symbols to communicate uplink control information, wherein the quantity of symbols is based on a payload size of the uplink control information; and means for communicating the uplink control information using the determined quantity of symbols.

Another aspect of the disclosure provides a non-transitory computer-readable medium storing computer-executable code, including code to: determine a quantity of symbols to communicate uplink control information, wherein the quantity of symbols is based on a payload size of the uplink control information; and communicate the uplink control information using the determined quantity of symbols.

In one aspect, the disclosure provides an apparatus configured for communication that includes a memory device and a processing circuit coupled to the memory device. The processing circuit is configured to: determine a quantity of beams for which channel information is transmitted to a base station, wherein the quantity of beams is based on whether uplink control information (UCI) is transmitted via a physical uplink control channel (PUCCH) or a physical uplink shared channel (PUSCH); and communicate the channel information for the determined quantity of beams.

Another aspect of the disclosure provides a method for communication including: determining a quantity of beams for which channel information is transmitted to a base station, wherein the quantity of beams is based on whether uplink control information (UCI) is transmitted via a physical uplink control channel (PUCCH) or a physical uplink shared channel (PUSCH); and communicating the channel information for the determined quantity of beams.

Another aspect of the disclosure provides an apparatus configured for communication. The apparatus including: means for determining a quantity of beams for which channel information is transmitted to a base station, wherein the quantity of beams is based on whether uplink control information (UCI) is transmitted via a physical uplink control channel (PUCCH) or a physical uplink shared channel (PUSCH); and means for communicating the channel information for the determined quantity of beams.

Another aspect of the disclosure provides a non-transitory computer-readable medium storing computer-executable code, including code to: determine a quantity of beams for which channel information is transmitted to a base station, wherein the quantity of beams is based on whether uplink control information (UCI) is transmitted via a physical uplink control channel (PUCCH) or a physical uplink shared channel (PUSCH); and communicate the channel information for the determined quantity of beams.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Various aspects of the disclosure relate to communicating uplink control information. In some aspects, the uplink control information provides feedback for beamformed communication.

Figure 1:
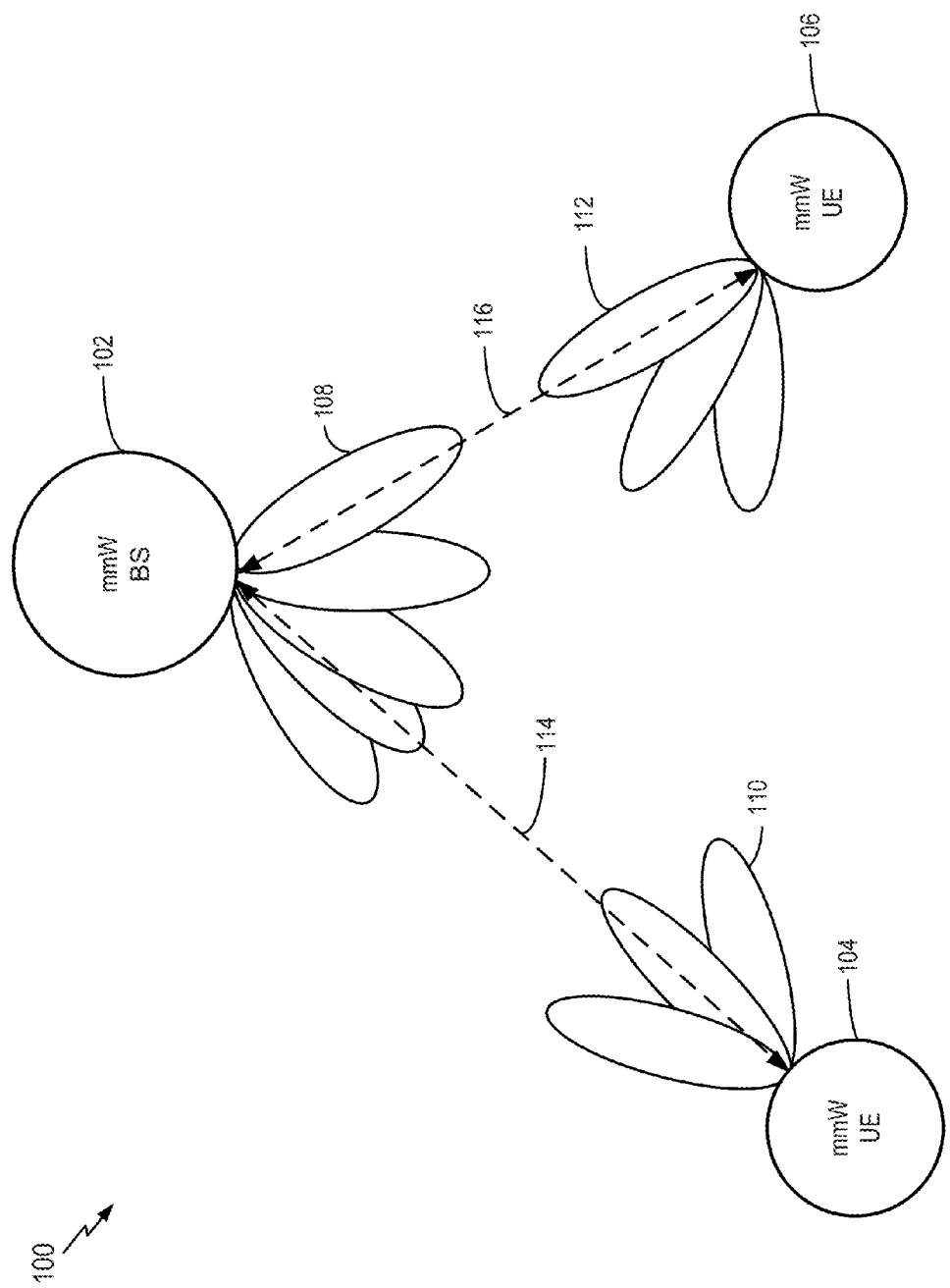
FIG. 1 is a diagram of an example communication system employing beamforming within which aspects of the disclosure may be implemented.
Figure 2:
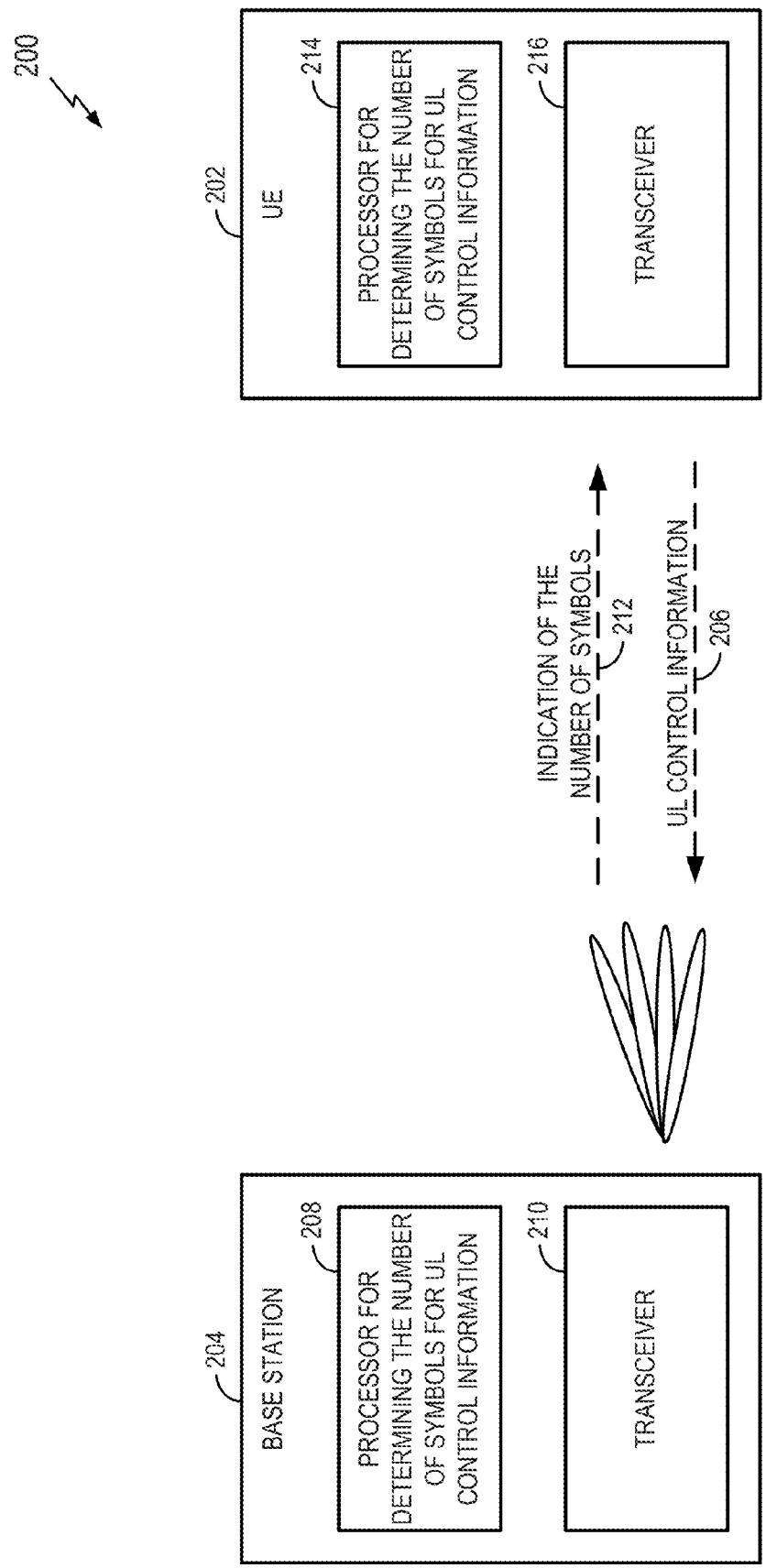
FIG. 2 is a block diagram of an example communication system for communicating UL control information in accordance with some aspects of the disclosure.

FIG. 2 illustrates a communication system 200 where a UE 202 sends uplink control information 206 to a base station 204. The number of symbols used to communicate the uplink control information 206 may be based on a link gain associated with the UE and/or based on a payload size of the uplink control information 206. To this end, the base station 204 includes a processor 208 for determining the number of symbols used by or to be used by the UE 202 to send the uplink control information 206. In the latter case, the processor 208 may select the number of symbols based on link gain and/or payload size information acquired by the base station 204 and then use a transceiver 210 to send an indication 212 of the number of symbols to the UE 202. The UE 202 includes a processor 214 for determining the number of symbols to be used by the UE 202 to send the uplink control information 206. This determination may be based on the indication 212 (received by a transceiver 216) or based on an independent determination made by the processor 214 (e.g., based on link gain and/or payload size information acquired by the UE 202). The UE 202 then uses the transceiver 216 to send the uplink control information 206 to the transceiver 210 via the determined number of symbols. In some implementations, the UE 202 and the base station 204 may include mmW functionality as in the UEs 104 and 106 and the base station 102 of FIG. 1, respectively.

Figure 3:
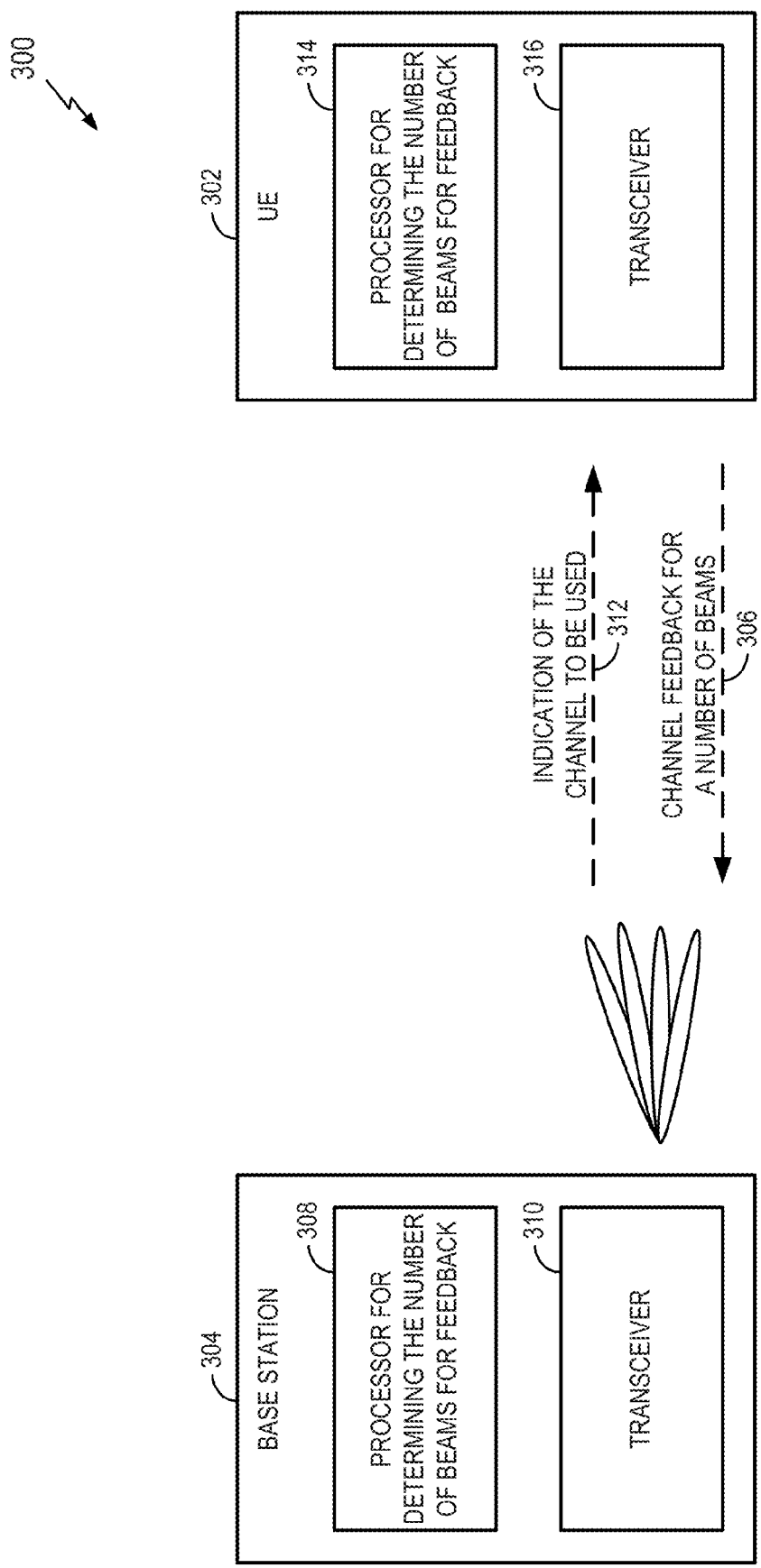
FIG. 3 is a block diagram of an example communication system for communicating channel information in accordance with some aspects of the disclosure.

FIG. 3 illustrates a communication system 300 where a UE 302 sends channel feedback 306 for a number of beams to a base station 304. In some aspects, the number of beams may be based on the type of channel that is used to send uplink control information. For example, channel feedback may be sent for fewer beams if the uplink control information is sent via a physical uplink control channel (PUCCH) as opposed to a physical uplink shared channel (PUSCH). To this end, the base station 304 includes a processor 308 for determining the number of beams for feedback (e.g., the number of beams for which the UE 302 sends channel feedback). In some implementations, the processor 308 may determine which channel the UE 302 is to use for sending uplink control information and then use a transceiver 310 to send an indication 312 of the channel to be used. The UE 302 includes a processor 314 for determining the number of beams for feedback. This determination may be based on the indication 312 (received by a transceiver 316) or based on an independent determination made by the processor 314 (e.g., based on a selection of the channel to be used for sending uplink control information). The UE 302 then uses the transceiver 316 to send the channel feedback 306 to the transceiver 310 for the determined number of beams. In some implementations, the UE 202 and the base station 204 may include mmW functionality as in the UEs 104 and 106 and the base station 102 of FIG. 1, respectively. In some implementations, the UE 302 and the base station 304 may correspond to the UE 202 and the base station 204 of FIG. 2, respectively.

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure. The teachings herein can be implemented according to various network technologies including, without limitation, fifth generation (5G) technology, fourth generation (4G) technology, third generation (3G) technology, and other network architectures. Thus, various aspects of the disclosure may be extended to networks based on 3rd Generation Partnership Project (3GPP) Long Term Evolution (LTE), LTE-Advanced (LTE-A) (in FDD, TDD, or both modes), Universal Mobile Telecommunications System (UMTS), Global System for Mobile Communications (GSM), Code Division Multiple Access (CDMA), Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system. For purposes of illustration, the following may describe various aspects in the context of a 5G system and/or an LTE system. It should be appreciated, however, that the teachings herein may be employed in other systems as well. Thus, references to functionality in the context of 5G and/or LTE terminology should be understood to be equally applicable to other types of technology, networks, components, signaling, and so on.

Communicating SRS and Uplink Control Information

The disclosure relates in some aspects to communicating a sounding reference signal and uplink control information via different sets of symbols in a frame. For example, a user equipment may transmit a sounding reference signal (SRS) in one set of symbols of a frame and transmit physical uplink control channel (PUCCH) information in another set of symbols of the frame. The sounding reference signal and uplink control information may be communicated across the total bandwidth of the component carrier used to transmit the frame. Also, the sounding reference signal in a given frame may be associated with a single user equipment.

In some aspects, the disclosure relates to a sub-frame format with at least two UL control symbols. One UL control symbol can be used to collect a CQI, an ACK/NAK, a PMI, and an SR. Another UL control symbol can be used to collect SRS from UEs.

Figure 4:
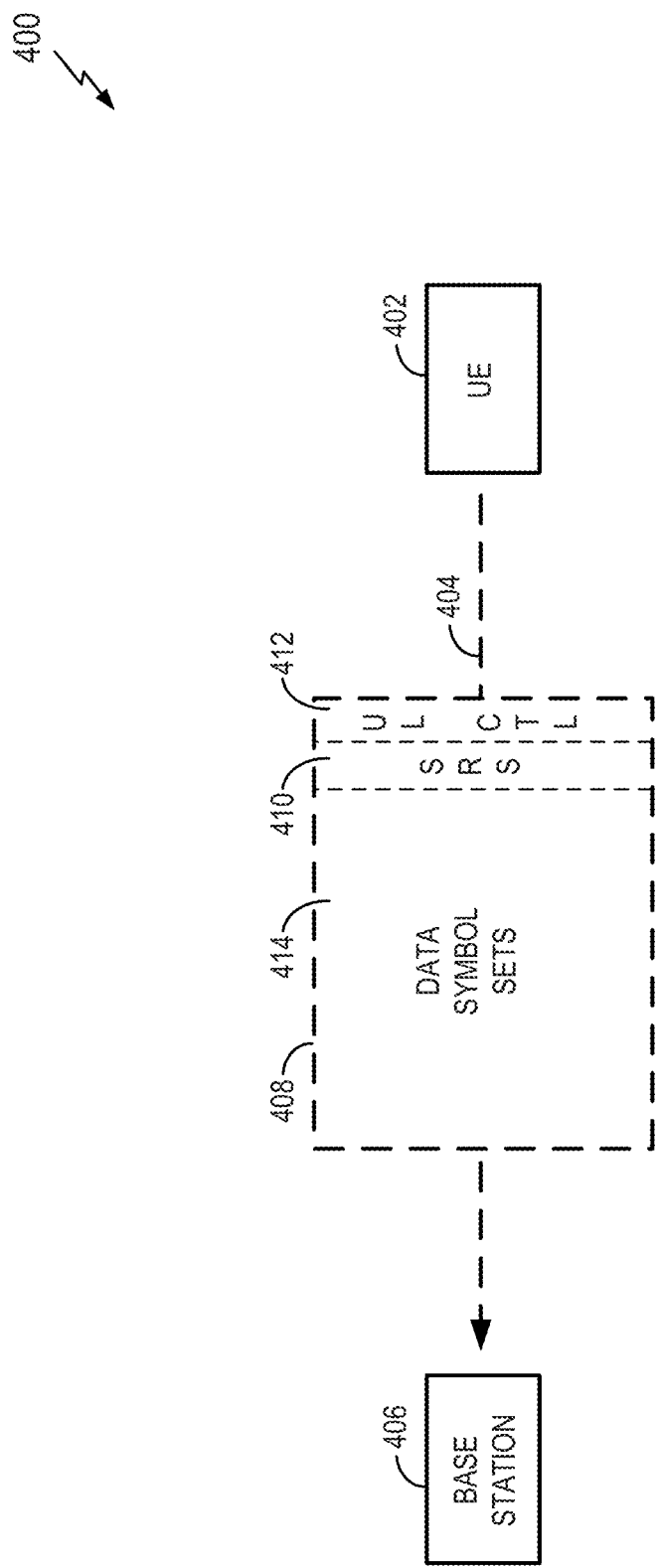
FIG. 4 is a diagram of an example communication system employing sounding reference signal (SRS) and UL control information communication in accordance with some aspects of the disclosure.

FIG. 4 illustrates a communication system 400 where a UE 402 sends uplink information 404 to a base station 406. As represented by a time (x axis) and frequency (y axis) resource block 408, an SRS 410 and UL control information 412 may be sent via different sets of symbols. For example, data 414 may be sent via a first set of symbols, the SRS 410 sent via a second set of symbols, and the UL control information 412 sent via a third set of symbols. In some implementations, the UE 402 and the base station 406 may include mmW functionality as in the UEs 104 and 106 and the base station 102 of FIG. 1, respectively. In some implementations, the UE 402 and the base station 406 may correspond to the UE 202 and the base station 204 of FIG. 2 and/or the UE 302 and the base station 304 of FIG. 3.

Example Self-Contained Sub-Frame Structures

Figure 5:
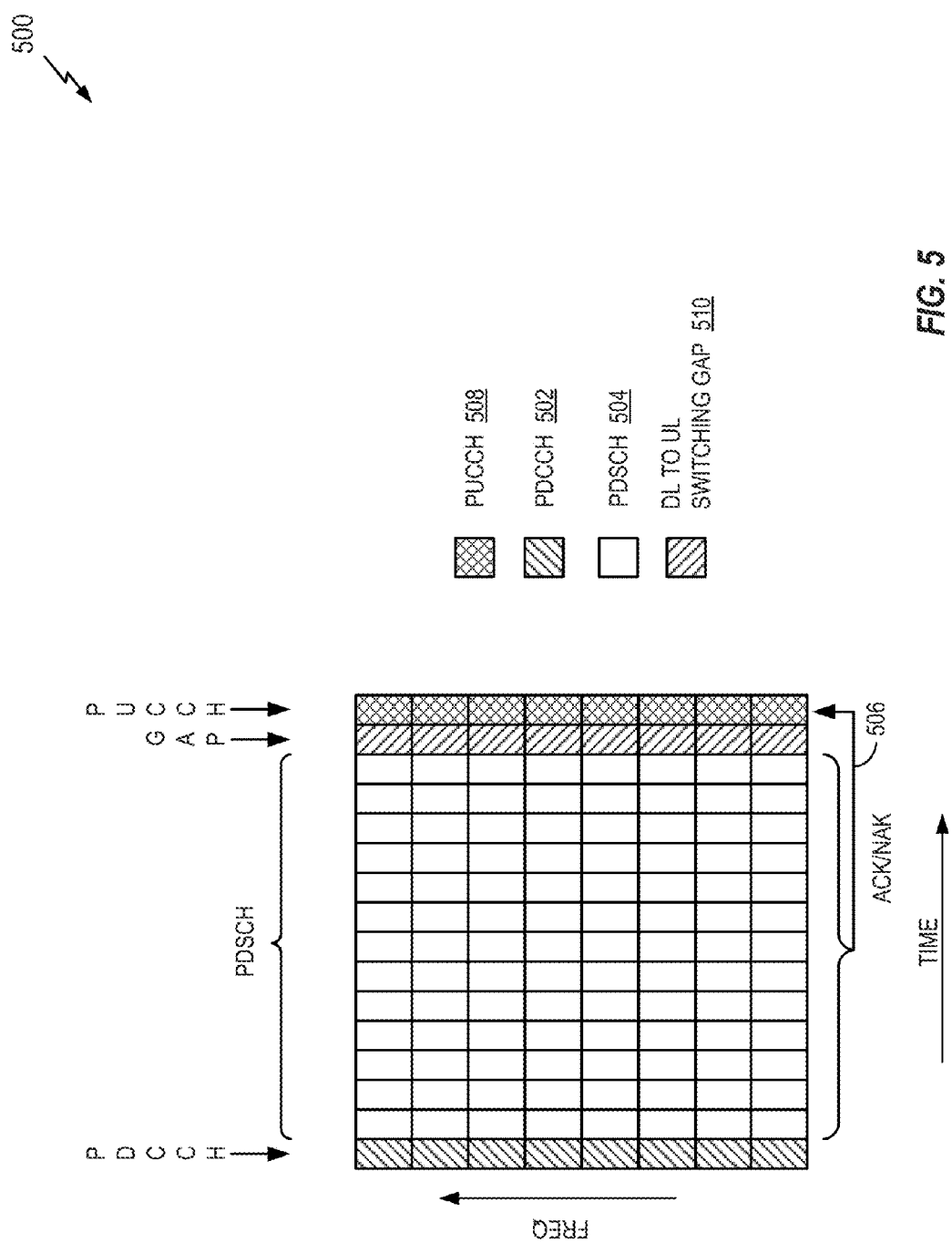
FIG. 5 is a diagram of an example of a self-contained downlink (DL) sub-frame structure in accordance with some aspects of the disclosure.
Figure 6:
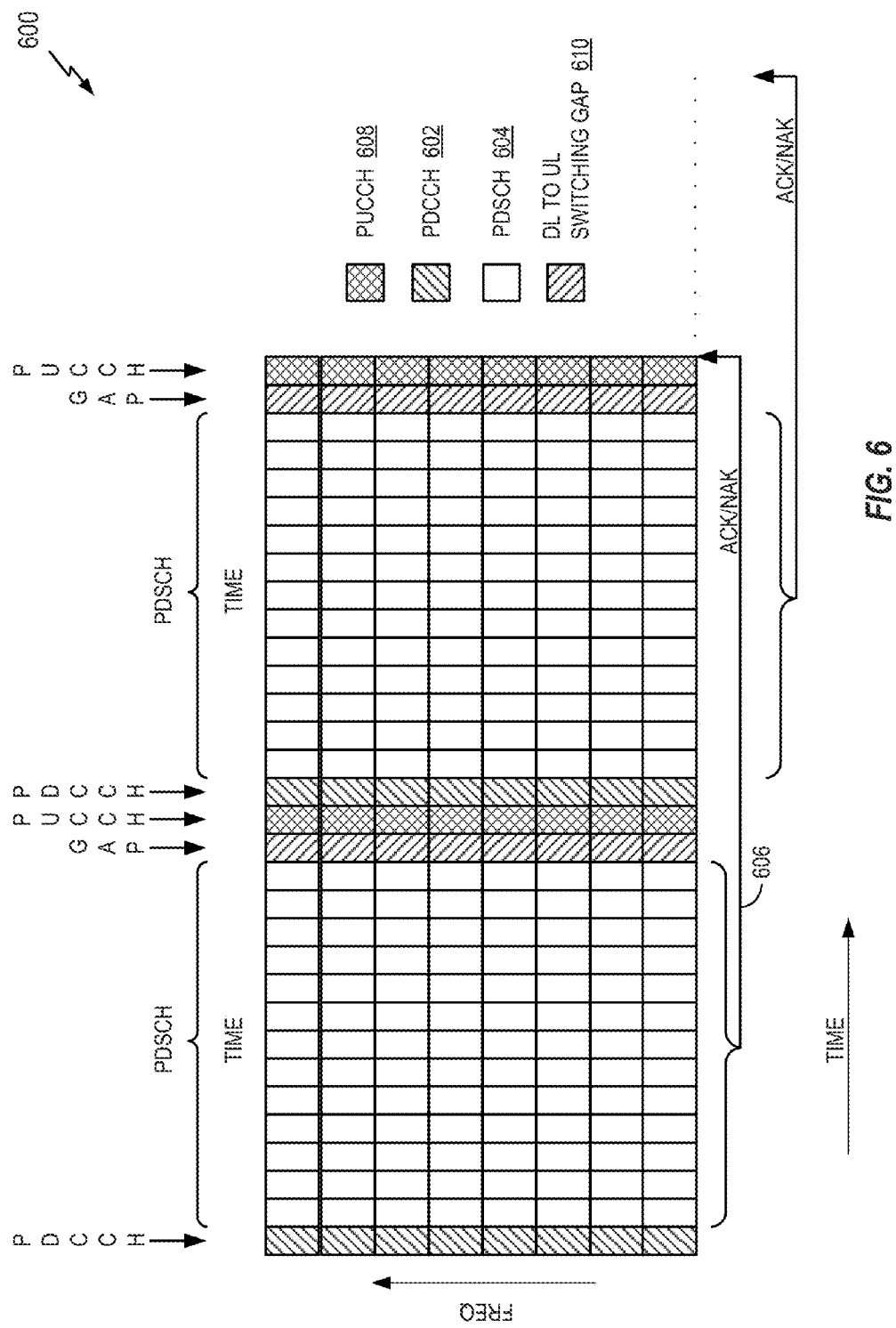
FIG. 6 is a diagram of an example of a DL sub-frame for certain types of UEs in accordance with some aspects of the disclosure.

FIGS. 5 and 6 illustrate examples of self-contained sub-frame structures. In some aspects, a self-contained sub-frame structure may include at least one symbol for the DL direction and at least one symbol for the UL direction. For example, a DL-centric sub-frame with symbols for DL data may include at least one symbol for transmission of UL control information (e.g., ACK/NAK, etc.).

FIG. 5 illustrates an example of a self-contained DL sub-frame structure 500. A BS sends control information (e.g., a physical downlink control channel, PDCCH 502) in the first symbol. The BS sends data in symbol indices 2-12 (e.g., a physical downlink shared channel, PDSCH 504). A UE sends an ACK/NAK 506 of received data (e.g., via physical uplink control channel, PUCCH 508) in the last symbol. The sub-frame structure 500 also includes a switching gap 510 in the second to last symbol. The gap 510 accommodates the switch from DL (the last PDSCH symbol) to UL (the PUCCH symbol).

Some UEs (e.g., category 0 UEs) might not be able to generate an ACK/NAK within one symbol. These types of UEs could send the ACK/NAK in the next sub-frame as shown in the sub-frame structures 600 of FIG. 6. Each sub-frame structure in FIG. 6 incldes a symbol for control information (e.g., PDCCH 602), symbols for data (e.g., PDSCH 604), a symbol for ACK/NAK 606 of received data (e.g., PUCCH 508), and a symbol for a switching gap 610. As indicated, each ACK/NAK is sent one sub-frame after the data covered by the ACK/NAK.

Sub-Frame with SRS

As discussed above in conjunction with FIG. 4, in some implementations, an SRS may be sent in the same sub-frame as UL control information. There may be issues, however, with receiving the SRS along with the CQI, the ACK/NAK, the SR, and the PMI in one symbol. For example, a BS may use the SRS to estimate channel quality and enable frequency selective scheduling on the UL. Although the UL receive (RX) beamforming used to receive the CQI and the ACK/NAK does not need to be UE-specific, it is desirable for the UL RX beamforming that is used to receive the sounding reference signal (SRS) to be UE-specific to provide a good channel estimate.

In general, it may be desirable to not use a UE-specific scheduling request (RS). Scheduling requests (SRs) can come from UEs located in any angular region. Thus, a BS might not have the channel knowledge of that particular UE in advance.

Also, if a BS performs UE-specific UL RX beamforming to receive an SRS, the BS might not receive an SR from UEs that are located in a different angular region. Accordingly, one UL control symbol might not be sufficient in this scenario.

Sub-Frame Structure with Multiple UL Control Symbols

Figure 7:
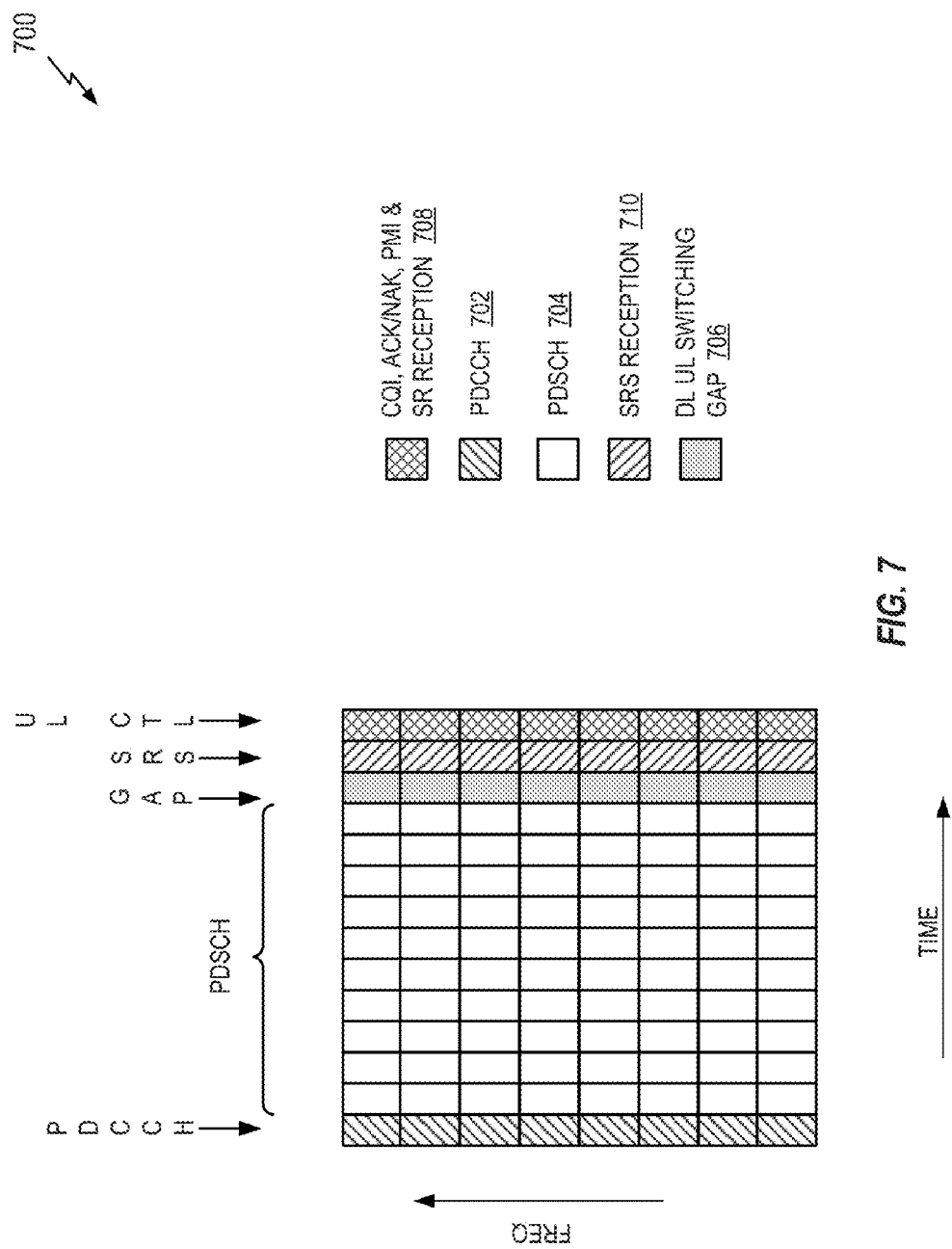
FIG. 7 is a diagram of an example of a sub-frame with two UL control symbols in accordance with some aspects of the disclosure.

The disclosure relates in some aspects to a sub-frame format with at least two UL control symbols. FIG. 7 illustrates an example of such a sub-frame structure 700. The sub-frame structure 700 includes a symbol for DL control information (e.g., PDCCH 702), symbols for data (e.g., PDSCH 704), and a symbol for a switching gap 706.

A first UL control symbol (UL CTL) is used to collect CQI, ACK/NAK, PMI and SR 708. UL RX beamforming can be direction-specific or even omni-directional. The UL control symbol may be available in most sub-frames. The UL control symbol may be scheduled explicitly (e.g., by a BS) or implicitly (e.g., based on UE ID).

A second UL control symbol is used to collect SRS 710 from UEs. As discussed above, it is desirable for UL RX beamforming to be UE-specific. The other UL control symbol may be available in some sub-frames (e.g., as per demand) A BS may explicitly schedule UEs to transmit SRS in this symbol or UEs may be scheduled implicitly (e.g., based on UE ID). As discussed herein, the UL control information may be carried by a physical uplink control channel (PUCCH) or some other suitable channel or channels.

UL and DL Sub-Frame Formats

Figure 8:
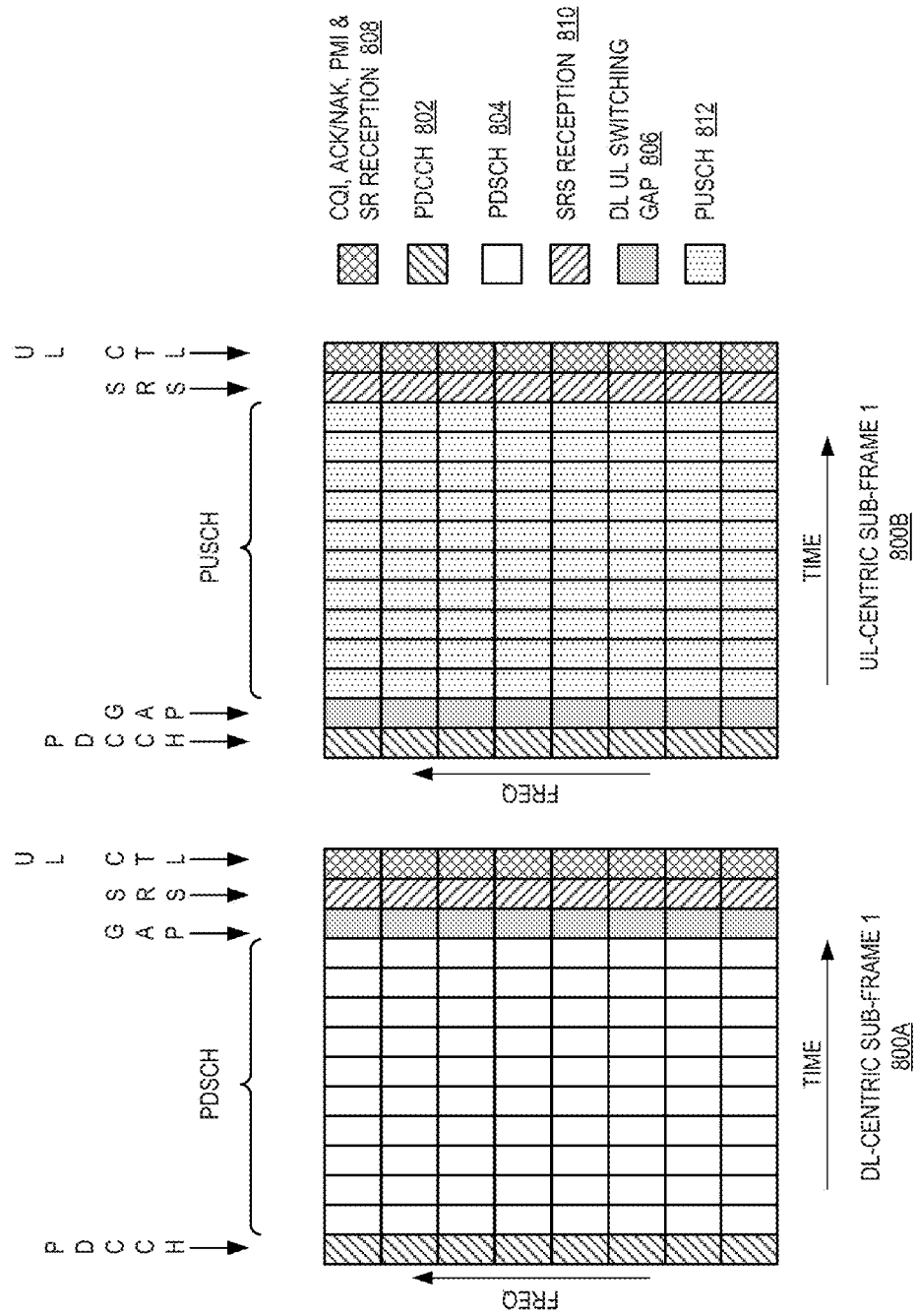
FIG. 8 is a diagram of an example of DL centric and UL centric sub-frame formats in accordance with some aspects of the disclosure.

FIG. 8 illustrates an example of different sub-frame formats with two UL control symbols. The first sub-frame structure 800A is for a DL-centric sub-frame and the second sub-frame structure 800B is for an UL-centric sub-frame.

The first sub-frame structure 800A corresponds to the sub-frame structure 700 of FIG. 7. Thus, the sub-frame structure 800A includes a symbol for DL control information (e.g., PDCCH 802), symbols for DL data (e.g., PDSCH 804), a symbol for a switching gap 806, a first UL control symbol (UL CTL) for CQI, ACK/NAK, PMI and SR 808, and a second UL control symbol for SRS 810.

The second sub-frame structure 800B can carry UL data. The sub-frame structure 800B includes a symbol for DL control information (e.g., PDCCH 802), a symbol for a switching gap 806, symbols for UL data (e.g., PUSCH 812), a first UL control symbol (UL CTL) for CQI, ACK/NAK, PMI and SR 808, and a second UL control symbol for SRS 810. As discussed herein, the UL control information may be carried by a physical uplink control channel (PUCCH) or some other suitable channel or channels.

An UL centric sub-frame as used herein may be different from LTE as follows. In LTE, UL control is transmitted in outer bands across all symbols; while as used herein, UL control may be transmitted across all tones of the last set of symbols.

Figure 9:
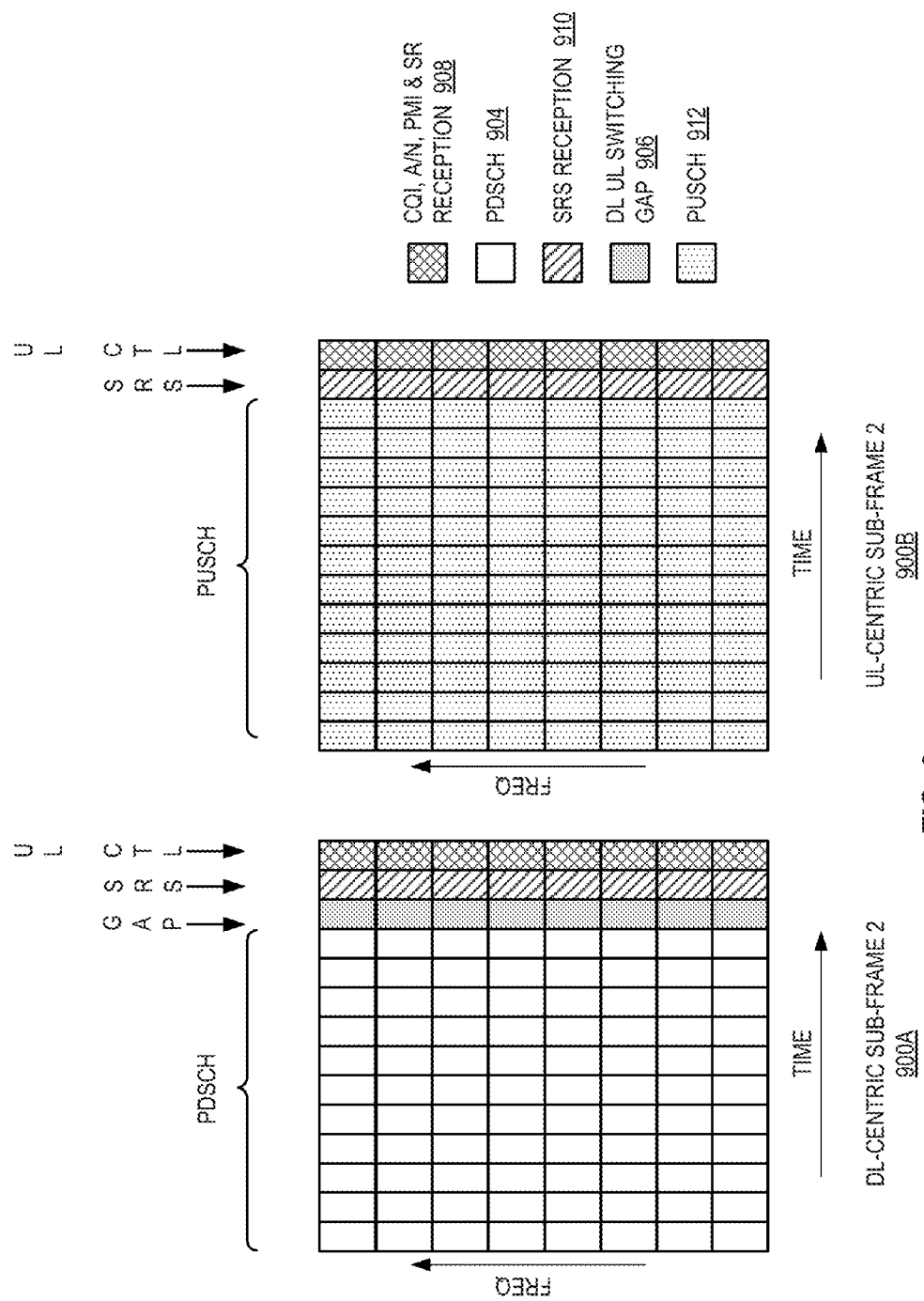
FIG. 9 is a diagram of another example of DL centric and UL centric sub-frame formats in accordance with some aspects of the disclosure.

FIG. 9 illustrates another example of different sub-frame formats with two UL control symbols. The control information of each of these sub-frames is conveyed in one or more previous sub-frames (not shown in FIG. 9).

The first sub-frame structure 900A includes symbols for DL data (e.g., PDSCH 904), a symbol for a switching gap 906, a first UL control symbol (UL CTL) for CQI, ACK/NAK, PMI and SR 908, and a second UL control symbol for SRS 910. As discussed herein, the UL control information may be carried by a physical uplink control channel (PUCCH) or some other suitable channel or channels.

The second sub-frame structure 900B includes symbols for UL data (e.g., PUSCH 912), a first UL control symbol (UL CTL) for CQI, ACK/NAK, PMI and SR 908, and a second UL control symbol for SRS 910. As discussed herein, the UL control information may be carried by a physical uplink control channel (PUCCH) or some other suitable channel or channels.

Variable Number of Symbols

Figure 10:
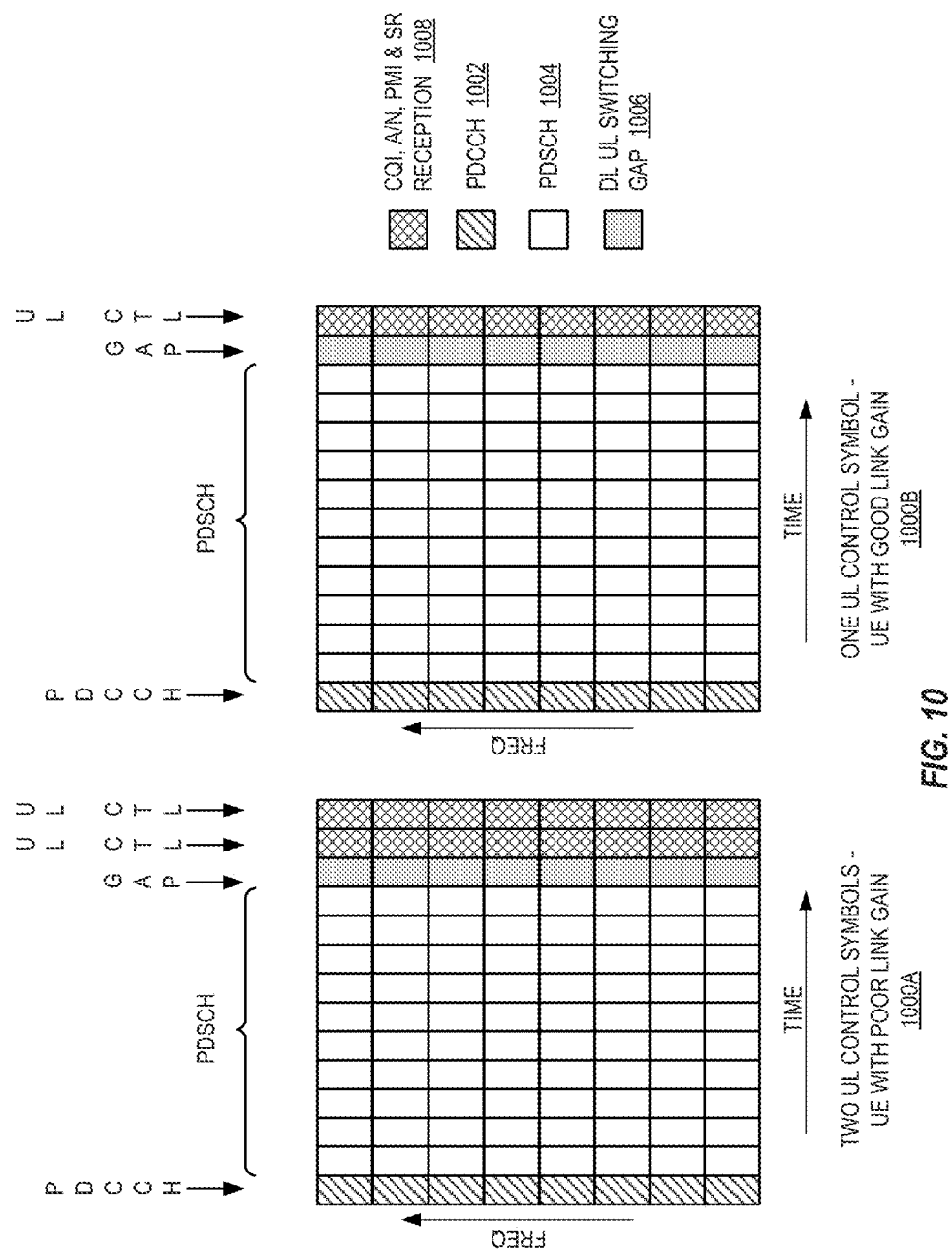
FIG. 10 is a diagram of an example of sub-frames including different quantities of uplink control symbols in accordance with some aspects of the disclosure.

FIG. 10 illustrates an example of sub-frame formats that show that a different number of symbols may be used for uplink control information in different sub-frames. Different scenarios could use a different number of symbols for uplink control information (e.g., two, three, or more symbols).

The first sub-frame structure 1000A uses two symbols for the uplink control information. Specifically, the first sub-frame structure 1000A includes a symbol for DL control information (e.g., PDCCH 1002), symbols for DL data (e.g., PDSCH 1004), a symbol for a switching gap 1006, and a two UL control symbols (UL CTL) for CQI, ACK/NAK, PMI and SR 1008 (and other UL control information, if applicable). As discussed herein, the UL CTL may be a physical uplink control channel (PUCCH) or some other suitable channel or channels.

The second sub-frame structure 1000B uses one symbol for the uplink control information. Specifically, the second sub-frame structure 1000B includes a symbol for DL control information (e.g., PDCCH 1002), symbols for DL data (e.g., PDSCH 1004), a symbol for a switching gap 1006, and an UL control symbol (UL CTL) for CQI, ACK/NAK, PMI and SR 1008 (and other UL control information, if applicable). As discussed herein, the UL CTL may be a physical uplink control channel (PUCCH) or some other suitable channel or channels.

In some aspects, the number of uplink control symbols may be based on channel information for a UE. In some aspects, the channel information may depend on at least one of: at least one parameter of a path loss associated with a user equipment, an angle of departure of a signal from the user equipment, or an angle of arrival of a signal at a base station.

For example, a larger number of control symbols may be needed if a UE has relatively poor link gain (e.g., one symbol might not be sufficient to reliably send the control information). In contrast, a smaller number of control symbols may be sufficient if a UE has relatively good link gain.

Other examples of channel information that may be used to determine the number of control symbols to be used include at least one of: a received signal strength indicator, reference signal received power, reference signal received quality, narrowband channel quality information, or reference signal received power of beams of neighboring cells.

In some aspects, the number of uplink control symbols may be based on control information associated with a UE. Examples of control information that may be used to determine the number of control symbols to be used include at least one of: how much feedback information needs to be sent, precoding matrix information, a scheduling request, narrowband channel quality information, beam information (e.g., for narrowband beams), or acknowledgement information (e.g., ACK or NAK).

Different Uplink Channels

Figure 11:
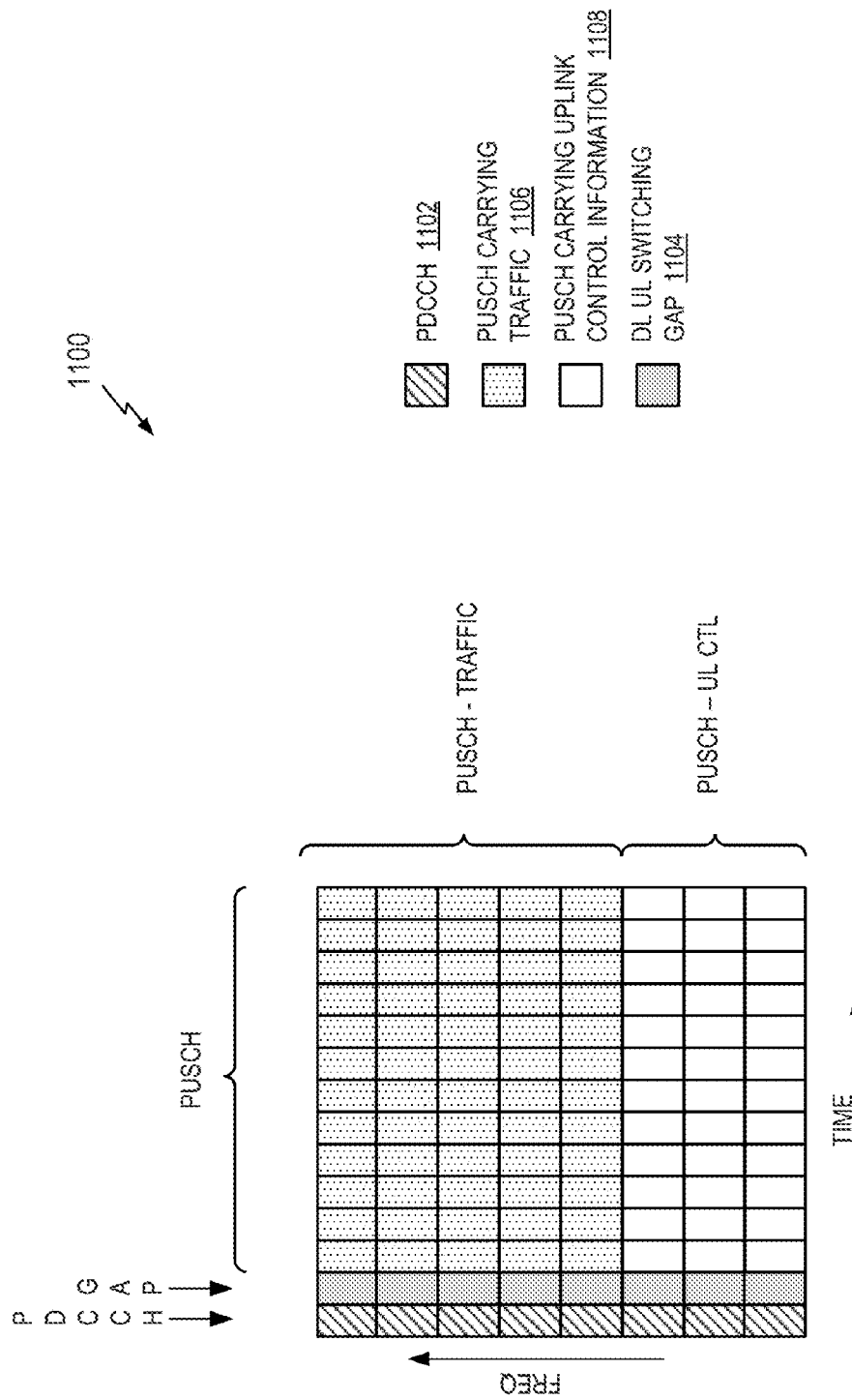
FIG. 11 is a diagram of an example of sub-frame that carriers of uplink control information in PUSCH in accordance with some aspects of the disclosure.

Uplink control information may be sent via different uplink channels. As discussed above in conjunction with FIGS. 5-10, uplink control information may be sent via a physical uplink control channel (PUCCH) in some implementations. FIG. 11 illustrates an alternative example where uplink control information is sent via a physical uplink shared channel (PUSCH). Other examples may use other types of uplink channels or other frame formats.

The sub-frame structure 1100 of FIG. 11 includes a symbol for DL control information (e.g., PDCCH 1102), a symbol for a switching gap 1104, symbols for UL data (e.g., PUSCH carrying traffic 1106), and symbols for UL control information (e.g., PUSCH carrying UL CTL 1108).

In some implementations, a base station instructs a UE as to which channel is to be used. For example, a base station may inform a user equipment via a physical downlink control channel if the user equipment is to transmit the uplink control information via the PUCCH or the PUSCH. As another example, separate bits are reserved in downlink control information (DCI) formats to indicate whether the user equipment is to transmit the uplink control information via the PUCCH or the PUSCH.

Other Aspects

In view of the above, in some aspects, an apparatus (e.g., a BS) may generate a frame structure with multiple UL control symbols where UEs may transmit SRS in one set of symbols and CQI, ACK/NAK, PMI and SR in the other set of control symbols. In some aspects, the BS may explicitly schedule UEs to transmit SRS in one set of symbols. In some aspects, the BS may explicitly schedule UEs to transmit CQI, ACK/NAK, PMI and SR in the other set of symbols. In some aspects, UEs may use their IDs to determine the tone locations and the symbol locations where the UEs will transmit at least one of SRS, CQI, ACK/NAK, PMI, SR, or any combination thereof.

Further in view of the above, in some aspects, an apparatus (e.g., a UE) may communicate an SRS during a first set of symbols in a frame and communicate UL control information during a second set of symbols in the frame. In some aspects, a BS may determine (e.g., select) a group of users (e.g., UEs) that transmit SRS and/or UL control information simultaneously in the frame based on an angle of arrival of the signals from the users at the BS.

Beam Sweep at the Base Station

Path loss may be very high in MMW systems. Accordingly, MMW systems may use directional transmission to mitigate path loss. A base station may transmit a beam reference signal (BRS) by sweeping in all directions so that a UE can determine the best "coarse" beam identifier (ID). The UE feeds back the ID of the best "coarse" beam to the base station. Thereafter, the base station can transmit a channel state information reference signal (CSI-RS) so that a UE can track "fine" (e.g., refined) beams. The UE then feeds-back the channel information of BRS and CSI-RS to the base station (e.g., as uplink control information as discussed herein). The base station may send beam reference signals during a synchronization sub-frame. The base station may send CSI-RS signals during some symbols of a physical downlink shared channel (PDSCH) or a physical uplink shared channel (PUSCH).

Figure 12:
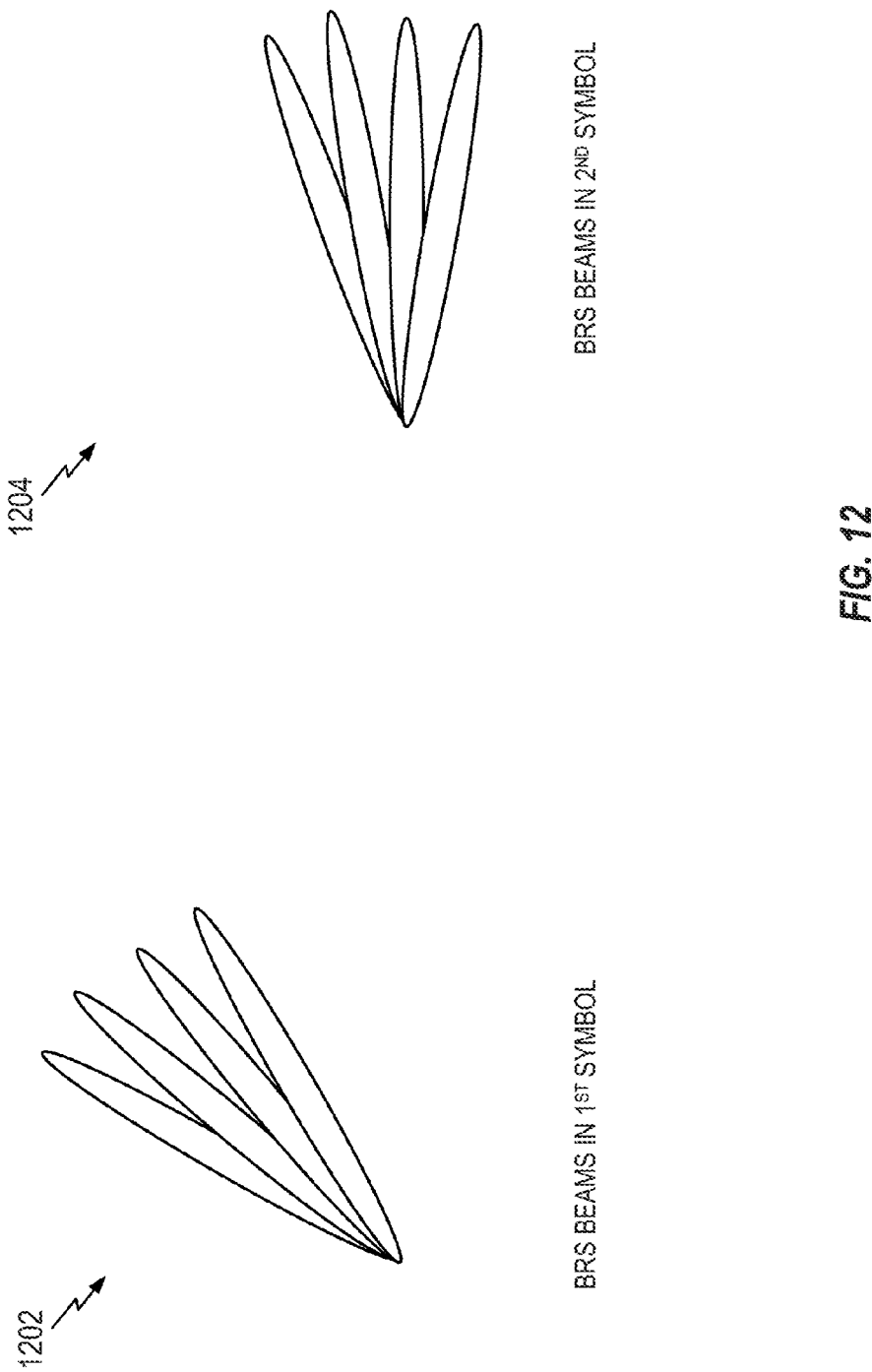
FIG. 12 is a diagram of examples of BRS sweeps in accordance with some aspects of the disclosure.

FIG. 12 illustrates two example beam sweeps for BRS where each sweep involves four beams (e.g., concurrent beams). Other examples may use a different number of beams per sweep. Also, beams transmitted during the same symbol might not be adjacent with each other.

During a first sweep 1202, a base station sweeps four directions using four antenna ports in a cell-specific manner in the first symbol of the synchronization sub-frame. These directions are "coarse" beam directions.

During a second sweep 1204, the base station sweeps four different directions in a cell-specific manner using four antenna ports in the second symbol of the synchronization sub-frame. These directions are also "coarse" beam directions.

Synchronization Sub-Frame

Figure 13:
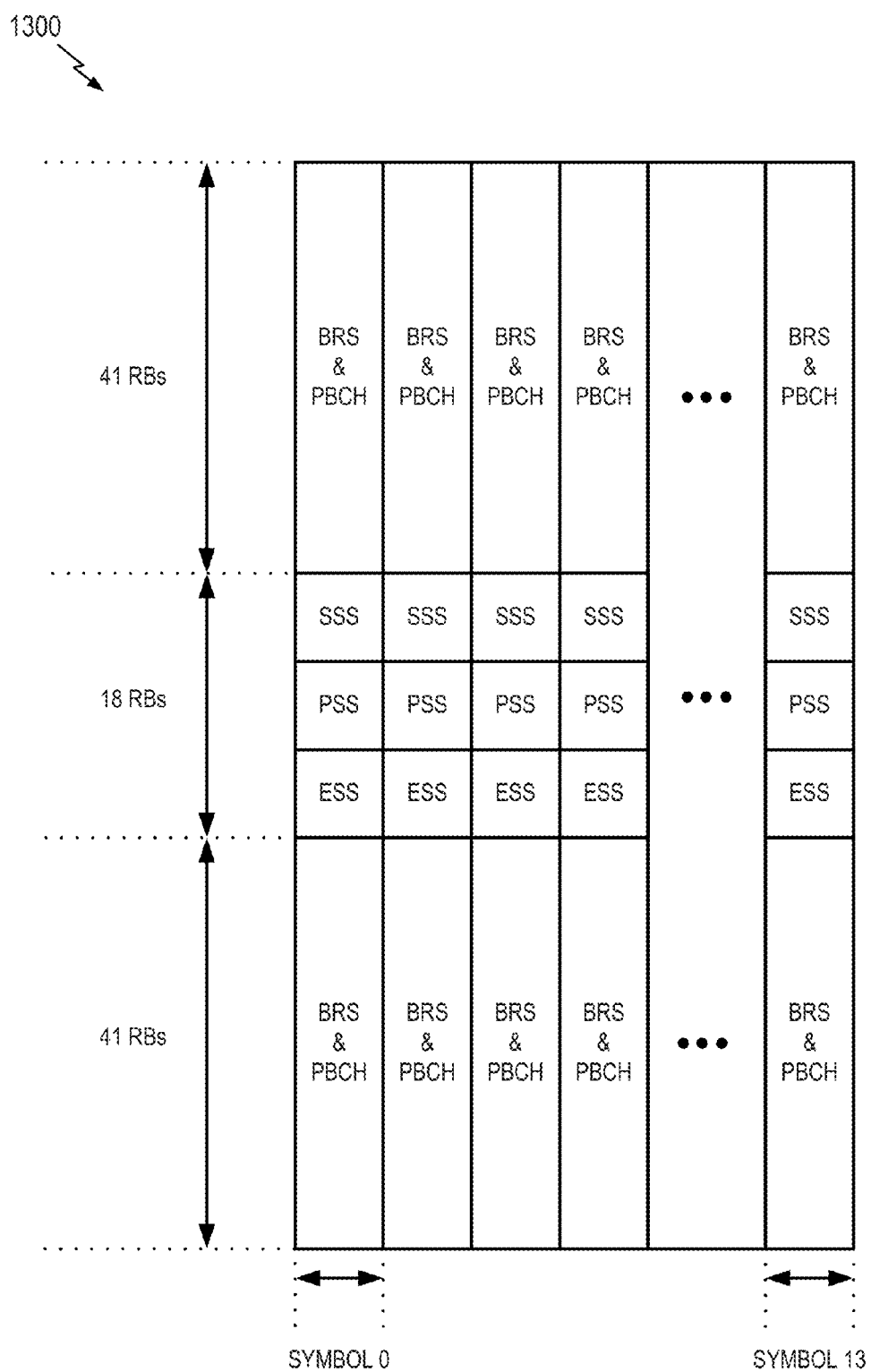
FIG. 13 is a diagram of an example of a synchronization sub-frame in accordance with some aspects of the disclosure.

FIG. 13 depicts an example of a synchronization sub-frame 1300. A synchronization sub-frame may take a different form in other examples.

In one example, 1, 2, 4, or 8 antenna ports may be active. The beam of each antenna port may change from symbol to symbol. Primary synchronization signal (PSS), extended synchronization signal (ESS), secondary synchronization signal (SSS), and physical broadcast channel (PBCH) may be transmitted by all antenna ports on the same subcarriers.

In some implementations, BRS may be transmitted by all antenna ports. Here, BRS may be transmitted on disjoint subcarriers in some cases. Alternatively, BRS may be code division multiplexed.

Beam Refinement

Figure 14:
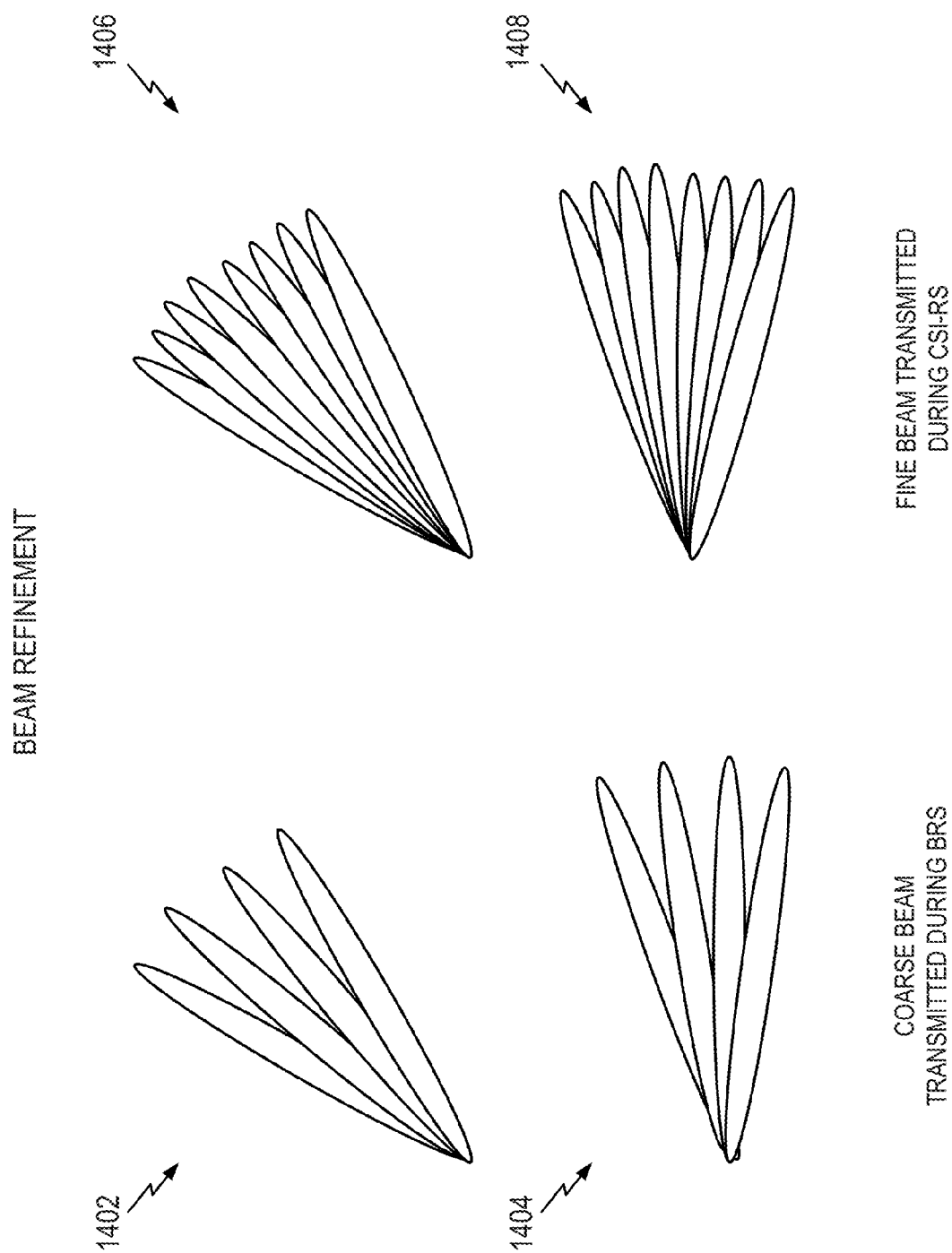
FIG. 14 is a diagram of an example of beam refinement in accordance with some aspects of the disclosure.
Figure 15:
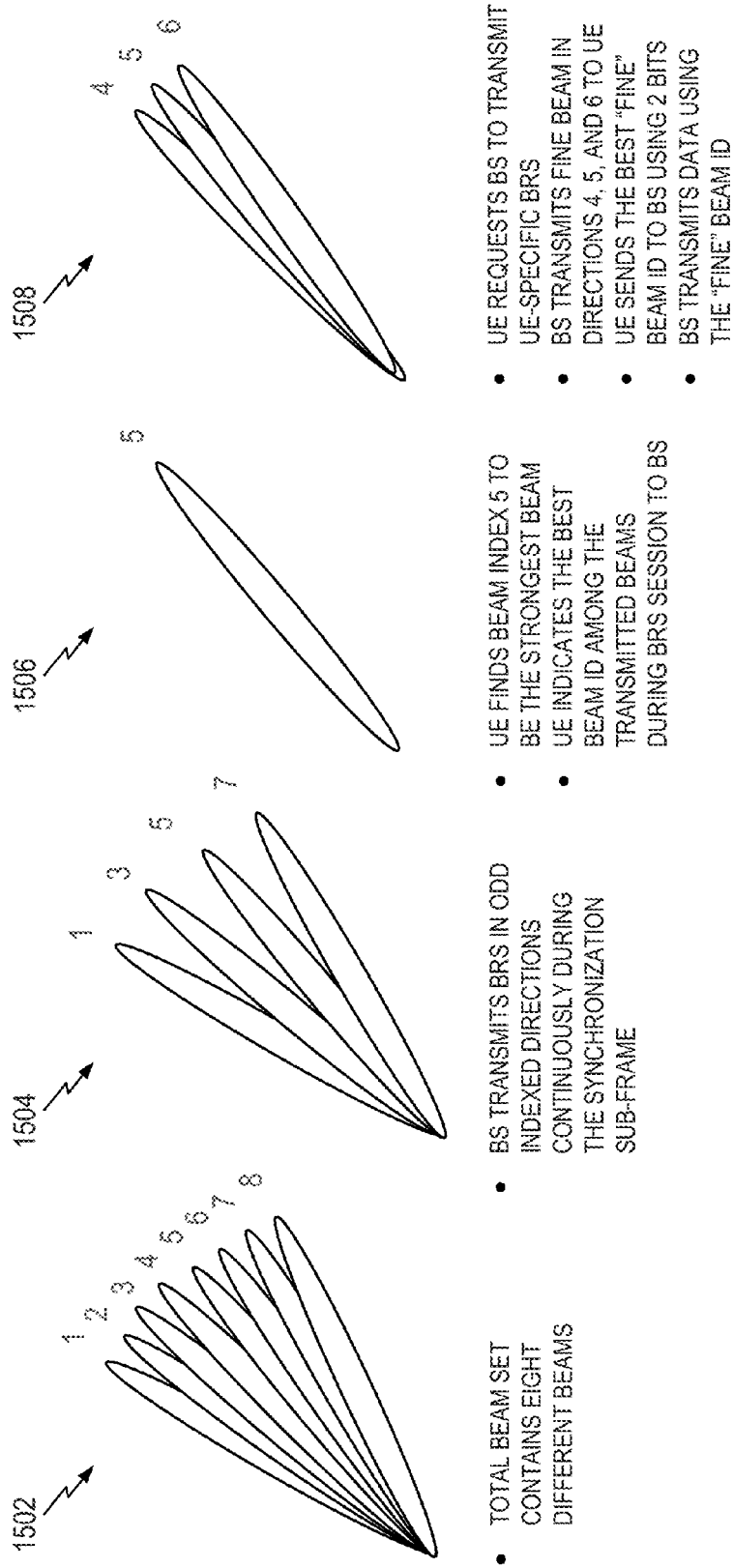
FIG. 15 is a diagram of another example of beam refinement in accordance with some aspects of the disclosure.

FIGS. 14 and 15 depict examples of a beam refinement. Beam refinement may take a different form in other examples.

Referring initially to FIG. 14, the beams 1402 and 1404 represent coarse beams that may be transmitted, for example, during a BRS session. The beams 1406 and 1408 represent fine beams that may be transmitted, for example, during a CSI-RS session.

FIG. 15 shows a more detailed example of a beam refinement during CSI-RS. A base station may transmit finer beams through different ports in the last two symbols of the sub-frame containing the CSI-RS. Different reference signals may be transmitted in different directions via different antenna ports.

As shown in the first beam representation 1502, the total beam set contains eight different beams. As shown in the second beam representation 1504, a base station may transmit BRS in odd indexed directions continuously during the synchronization sub-frame. As shown in the third beam representation 1506, a UE finds beam index 5 to be the strongest "coarse" beam. The UE then informs the base station of the best "coarse" beam ID among the beams transmitted during the BRS session (i.e., from beams IDs 1, 3, 5, and 7 in this example). As shown in the fourth beam representation 1508, the UE requests the base station to transmit a UE-specific CSI-RS. In response, the base station transmits a fine beam in directions 4, 5 and 6 to the UE in CSI-RS. The UE then sends the ID of the best fine "beam" to the base station (e.g., using 2 bits). In response, the base station transmits data using this "fine" beam ID.

Channel Feedback Information

As discussed herein, a UE feeds-back the channel information of different beams to the base station. The base station then schedules the best beam for traffic based on UE's feedback. The number of beams whose channel information are fed-back to the base station can depend on the link gain of the UE. UEs whose link gain is poor might only be able to feed-back one beam's channel information. UEs whose link gain is good might feed-back multiple beams' channel information. Feedback can go through either PUCCH or PUSCH as discussed above.

First Example Apparatus

Figure 16:
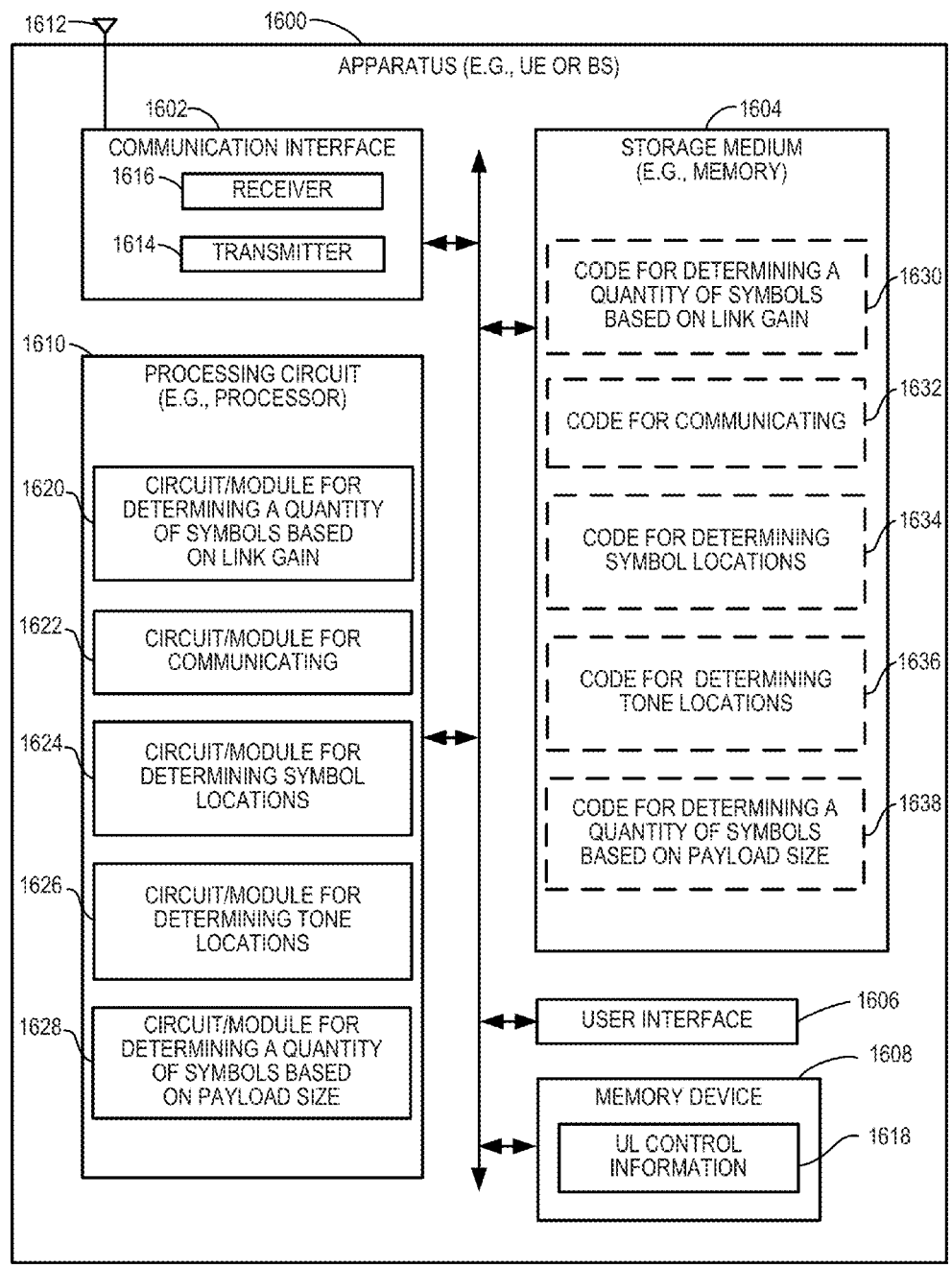
FIG. 16 is a block diagram illustrating an example hardware implementation for an apparatus (e.g., an electronic device) that can support communication in accordance with some aspects of the disclosure.

FIG. 16 illustrates a block diagram of an example hardware implementation of an apparatus 1600 configured to communicate according to one or more aspects of the disclosure. The apparatus 1600 could embody or be implemented within a UE, a BS, or some other type of device that supports wireless communication. In various implementations, the apparatus 1600 could embody or be implemented within an access terminal, an access point, or some other type of device. In various implementations, the apparatus 1600 could embody or be implemented within a mobile phone, a smart phone, a tablet, a portable computer, a server, a personal computer, a sensor, an entertainment device, a medical device, or any other electronic device having circuitry.

The apparatus 1600 includes a communication interface (e.g., at least one transceiver) 1602, a storage medium 1604, a user interface 1606, a memory device (e.g., a memory circuit) 1608, and a processing circuit 1610 (e.g., at least one processor). In various implementations, the user interface 1606 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 16. The signaling bus may include any number of interconnecting buses and bridges depending on the specific application of the processing circuit 1610 and the overall design constraints. The signaling bus links together various circuits such that each of the communication interface 1602, the storage medium 1604, the user interface 1606, and the memory device 1608 are coupled to and/or in electrical communication with the processing circuit 1610. The signaling bus may also link various other circuits (not shown) such as timing sources, peripherals, voltage regulators, and power management circuits, which are well known in the art, and therefore, will not be described any further.

The communication interface 1602 provides a means for communicating with other apparatuses over a transmission medium. In some implementations, the communication interface 1602 includes circuitry and/or programming adapted to facilitate the communication of information bi-directionally with respect to one or more communication devices in a network. In some implementations, the communication interface 1602 is adapted to facilitate wireless communication of the apparatus 1600. In these implementations, the communication interface 1602 may be coupled to one or more antennas 1612 as shown in FIG. 16 for wireless communication within a wireless communication system. The communication interface 1602 can be configured with one or more standalone receivers and/or transmitters, as well as one or more transceivers. In the illustrated example, the communication interface 1602 includes a transmitter 1614 and a receiver 1616. The communication interface 1602 serves as one example of a means for receiving and/or means transmitting.

The memory device 1608 may represent one or more memory devices. As indicated, the memory device 1608 may maintain uplink control information 1618 along with other information used by the apparatus 1600. In some implementations, the memory device 1608 and the storage medium 1604 are implemented as a common memory component. The memory device 1608 may also be used for storing data that is manipulated by the processing circuit 1610 or some other component of the apparatus 1600.

The storage medium 1604 may represent one or more computer-readable, machine-readable, and/or processor-readable devices for storing programming, such as processor executable code or instructions (e.g., software, firmware), electronic data, databases, or other digital information. The storage medium 1604 may also be used for storing data that is manipulated by the processing circuit 1610 when executing programming. The storage medium 1604 may be any available media that can be accessed by a general purpose or special purpose processor, including portable or fixed storage devices, optical storage devices, and various other mediums capable of storing, containing or carrying programming By way of example and not limitation, the storage medium 1604 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1604 may be embodied in an article of manufacture (e.g., a computer program product). By way of example, a computer program product may include a computer-readable medium in packaging materials. In view of the above, in some implementations, the storage medium 1604 may be a non-transitory (e.g., tangible) storage medium.

The storage medium 1604 may be coupled to the processing circuit 1610 such that the processing circuit 1610 can read information from, and write information to, the storage medium 1604. That is, the storage medium 1604 can be coupled to the processing circuit 1610 so that the storage medium 1604 is at least accessible by the processing circuit 1610, including examples where at least one storage medium is integral to the processing circuit 1610 and/or examples where at least one storage medium is separate from the processing circuit 1610 (e.g., resident in the apparatus 1600, external to the apparatus 1600, distributed across multiple entities, etc.).

Programming stored by the storage medium 1604, when executed by the processing circuit 1610, causes the processing circuit 1610 to perform one or more of the various functions and/or process operations described herein. For example, the storage medium 1604 may include operations configured for regulating operations at one or more hardware blocks of the processing circuit 1610, as well as to utilize the communication interface 1602 for wireless communication utilizing their respective communication protocols.

The processing circuit 1610 is generally adapted for processing, including the execution of such programming stored on the storage medium 1604. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1610 is arranged to obtain, process and/or send data, control data access and storage, issue commands, and control other desired operations. The processing circuit 1610 may include circuitry configured to implement desired programming provided by appropriate media in at least one example. For example, the processing circuit 1610 may be implemented as one or more processors, one or more controllers, and/or other structure configured to execute executable programming Examples of the processing circuit 1610 may include a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1610 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1610 are for illustration and other suitable configurations within the scope of the disclosure are also contemplated.

According to one or more aspects of the disclosure, the processing circuit 1610 may be adapted to perform any or all of the features, processes, functions, operations and/or routines for any or all of the apparatuses described herein. For example, the processing circuit 1610 may be configured to perform any of the steps, functions, and/or processes described with respect to FIGS. 17-28. As used herein, the term "adapted" in relation to the processing circuit 1610 may refer to the processing circuit 1610 being one or more of configured, employed, implemented, and/or programmed to perform a particular process, function, operation and/or routine according to various features described herein.

The processing circuit 1610 may be a specialized processor, such as an application-specific integrated circuit (ASIC) that serves as a means for (e.g., structure for) carrying out any one of the operations described in conjunction with FIGS. 17-28. The processing circuit 1610 serves as one example of a means for transmitting and/or a means for receiving. In various implementations, the processing circuit 1610 may incorporate the functionality of the UE 202 (e.g., the processor 214) or the base station 204 (e.g., the processor 208) of FIG. 2, the UE 302 (e.g., the processor 314) or the base station 304 (e.g., the processor 308) of FIG. 3, or the UE 402 or the base station 406 of FIG. 4.

According to at least one example of the apparatus 1600, the processing circuit 1610 may include one or more of a circuit/module for determining a quantity of symbols based on link gain 1620, a circuit/module for communicating 1622, a circuit/module for determining symbol locations 1624, a circuit/module for determining tone locations 1626, or a circuit/module for determining a quantity of symbols based on payload size 1628. In various implementations, the circuit/module for determining a quantity of symbols based on link gain 1620, the circuit/module for communicating 1622, the circuit/module for determining symbol locations 1624, the circuit/module for determining tone locations 1626, or the circuit/module for determining a quantity of symbols based on payload size 1628 may correspond, at least in part, to the functionality of the UE 202 (e.g., the processor 214) or the base station 204 (e.g., the processor 208) of FIG. 2, the UE 302 (e.g., the processor 314) or the base station 304 (e.g., the processor 308) of FIG. 3, or the UE 402 or the base station 406 of FIG. 4.

As mentioned above, programming stored by the storage medium 1604, when executed by the processing circuit 1610, causes the processing circuit 1610 to perform one or more of the various functions and/or process operations described herein. For example, the programming, when executed by the processing circuit 1610, may cause the processing circuit 1610 to perform the various functions, steps, and/or processes described herein with respect to FIGS. 17-28 in various implementations. As shown in FIG. 16, the storage medium 1604 may include one or more of code for determining a quantity of symbols based on link gain 1630, code for communicating 1632, code for determining symbol locations 1634, code for determining tone locations 1636, or code for determining a quantity of symbols based on payload size 1638. In various implementations, the code for determining a quantity of symbols based on link gain 1630, the code for communicating 1632, the code for determining symbol locations 1634, the code for determining tone locations 1636, or the code for determining a quantity of symbols based on payload size 1638 may be executed or otherwise used to provide the functionality described herein for the circuit/module for determining a quantity of symbols based on link gain 1620, the circuit/module for communicating 1622, the circuit/module for determining symbol locations 1624, the circuit/module for determining tone locations 1626, or the circuit/module for determining a quantity of symbols based on payload size 1628.

The circuit/module for determining a quantity of symbols based on link gain 1620 may include circuitry and/or programming (e.g., code for determining a quantity of symbols based on link gain 1630 stored on the storage medium 1604) adapted to perform several functions relating to, for example, determining a quantity of symbols for communication of information (e.g., within a frame). In some aspects, the determined quantity of symbols may be used to communicate uplink control information. In some aspects, the determined quantity of symbols may be used to communicate a sounding reference signal.

In some implementations, the circuit/module for determining a quantity of symbols based on link gain 1620 obtains an indication of link gain associated with a particular UE (e.g., from the circuit/module for communicating 1622, the memory device 1608, the communication interface 1602, the receiver 1616, or some other component). The circuit/module for determining a quantity of symbols based on link gain 1620 then compares the link gain to one or more thresholds (or uses a gain-to-number table or some other suitable mapping) to determine the number of symbols that should be used for this particular link gain. The circuit/module for determining a quantity of symbols based on link gain 1620 then outputs an indication of the determined quantity of symbols (e.g., to the circuit/module for communicating 1622, the memory device 1608, the communication interface 1602, the transmitter 1614, or some other component).

In some implementations, the circuit/module for determining a quantity of symbols based on link gain 1620 directly obtains an indication of the quantity of symbols (e.g., from the circuit/module for communicating 1622, the memory device 1608, the communication interface 1602, the receiver 1616, or some other component). For example, the circuit/module for determining a quantity of symbols based on link gain 1620 may identify a memory location in the memory device 1608 that stores the quantity information and invokes a read of that location to obtain the information. The circuit/module for determining a quantity of symbols based on link gain 1620 then outputs the information (e.g., sends the information to the circuit/module for communicating 1622, sends the information to a process, or sends the information to another component of the apparatus 1600).

The circuit/module for communicating 1622 may include circuitry and/or programming (e.g., code for communicating 1632 stored on the storage medium 1604) adapted to perform several functions relating to, for example, communicating information. In some implementations, the communication involves receiving the information. In some implementations, the communication involves sending (e.g., transmitting) the information.

The information may take different forms in different scenarios. In some aspects, the circuit/module for communicating 1622 may communicate uplink control information (e.g., at particular symbol locations during a frame and/or at particular tone locations during a frame). In some aspects, the circuit/module for communicating 1622 may communicate scheduling information. In some aspects, the circuit/module for communicating 1622 may communicate a sounding reference signal.

In some implementation, the circuit/module for communicating 1622 may use one or more parameters for the communicating. For example, the circuit/module for communicating 1622 may obtain information about timing (e.g., symbol locations) and/or tone locations and communicate information at those locations.

In some implementations where the communicating involves receiving information, the circuit/module for communicating 1622 receives information (e.g., from the communication interface 1602, the receiver 1616, the memory device 1608, some other component of the apparatus 1600, or some other device), processes (e.g., decodes) the information, and outputs the information to another component of the apparatus 1600 (e.g., the memory device 1608 or some other component). In some scenarios (e.g., if the circuit/module for communicating 1622 includes a receiver), the communicating involves the circuit/module for communicating 1622 receiving information directly from a device that transmitted the information (e.g., via radio frequency signaling or some other type of signaling suitable for the applicable communication medium).

In some implementations where the communicating involves sending information, the circuit/module for communicating 1622 obtains information (e.g., from the memory device 1608 or some other component of the apparatus 1600), processes (e.g., encodes) the information, and outputs the processed information. In some scenarios, the communicating involves sending the information to another component of the apparatus 1600 (e.g., the transmitter 1614, the communication interface 1602, or some other component) that will transmit the information to another device. In some scenarios (e.g., if the circuit/module for communicating 1622 includes a transmitter), the communicating involves the circuit/module for communicating 1622 transmitting the information directly to another device (e.g., the ultimate destination) via radio frequency signaling or some other type of signaling suitable for the applicable communication medium.

In some implementations, the circuit/module for communicating 1622 is a transceiver. In some implementations, the circuit/module for communicating 1622 is a receiver. In some implementations, the circuit/module for communicating 1622 is a transmitter. In some implementations, the communication interface 1602 includes the circuit/module for communicating 1622 and/or the code for communicating 1632. In some implementations, the circuit/module for communicating 1622 and/or the code for communicating 1632 is configured to control the communication interface 1602 (e.g., a transceiver, a receiver, or a transmitter) to communicate the information.

The circuit/module for determining symbol locations 1624 may include circuitry and/or programming (e.g., code for determining symbol locations 1634 stored on the storage medium 1604) adapted to perform several functions relating to, for example, determining symbol locations for communication of information within a frame. In some aspects, the determined symbol locations may be used to communicate uplink control information.

In some implementations, the circuit/module for determining symbol locations 1624 performs the operations that follow if the determination of the symbol locations is based on an identifier of a user equipment. In this case, the circuit/module for determining symbol locations 1624 obtains the identifier (e.g., from the circuit/module for communicating 1622, the memory device 1608, the communication interface 1602, the receiver 1616, or some other component). The circuit/module for determining symbol locations 1624 then uses an identifier-to-symbol location mapping (e.g., in the form of a table, an algorithm, or some other suitable mapping) to identify the symbol location or locations associated with that identifier. The circuit/module for determining symbol locations 1624 then outputs an indication of the determined symbol locations (e.g., to the circuit/module for communicating 1622, the memory device 1608, the communication interface 1602, the transmitter 1614, or some other component).

The circuit/module for determining tone locations 1626 may include circuitry and/or programming (e.g., code for determining tone locations 1636 stored on the storage medium 1604) adapted to perform several functions relating to, for example, determining tone locations for communication of information within a frame. In some aspects, the determined tone locations may be used to communicate uplink control information.

In some implementations, the circuit/module for determining tone locations 1626 performs the operations that follow if the determination of the tone locations is based on an identifier of a user equipment. In this case, the circuit/module for determining tone locations 1626 obtains the identifier (e.g., from the circuit/module for communicating 1622, the memory device 1608, the communication interface 1602, the receiver 1616, or some other component). The circuit/module for determining tone locations 1626 then uses an identifier-to-tone location mapping (e.g., in the form of a table, an algorithm, or some other suitable mapping) to identify the tone location or locations associated with that identifier. The circuit/module for determining tone locations 1626 then outputs an indication of the determined tone locations (e.g., to the circuit/module for communicating 1622, the memory device 1608, the communication interface 1602, the transmitter 1614, or some other component).

The circuit/module for determining a quantity of symbols based on link gain 1620 may include circuitry and/or programming (e.g., code for determining a quantity of symbols based on link gain 1630 stored on the storage medium 1604) adapted to perform several functions relating to, for example, determining a quantity of symbols for communication of information (e.g., within a frame). In some aspects, the determined symbol locations may be used to communicate uplink control information. In some aspects, the determined symbol locations may be used to communicate a sounding reference signal.

The circuit/module for determining a quantity of symbols based on payload size 1628 may include circuitry and/or programming (e.g., code for determining a quantity of symbols based on payload size 1638 stored on the storage medium 1604) adapted to perform several functions relating to, for example, determining a quantity of symbols for communication of information (e.g., within a frame). In some aspects, the determined quantity of symbols may be used to communicate uplink control information. In some aspects, the determined quantity of symbols may be used to communicate a sounding reference signal.

In some implementations, the circuit/module for determining a quantity of symbols based on payload size 1628 obtains an indication of payload size associated with a particular UE (e.g., from the circuit/module for communicating 1622, the memory device 1608, the communication interface 1602, the receiver 1616, or some other component). The circuit/module for determining a quantity of symbols based on payload size 1628 then compares the payload size to one or more thresholds (or uses a payload size-to-number table or some other suitable mapping) to determine the number of symbols that should be used for this particular payload size. The circuit/module for determining a quantity of symbols based on payload size 1628 then outputs an indication of the determined quantity of symbols (e.g., to the circuit/module for communicating 1622, the memory device 1608, the communication interface 1602, the transmitter 1614, or some other component).

In some implementations, the circuit/module for determining a quantity of symbols based on payload size 1628 directly obtains an indication of the quantity of symbols (e.g., from the circuit/module for communicating 1622, the memory device 1608, the communication interface 1602, the receiver 1616, or some other component). For example, the circuit/module for determining a quantity of symbols based on payload size 1628 may identify a memory location in the memory device 1608 that stores the quantity information and invokes a read of that location to obtain the information. The circuit/module for determining a quantity of symbols based on payload size 1628 then outputs the information (e.g., sends the information to the circuit/module for communicating 1622, sends the information to a process, or sends the information to another component of the apparatus 1600).

First Example Process

Figure 17:
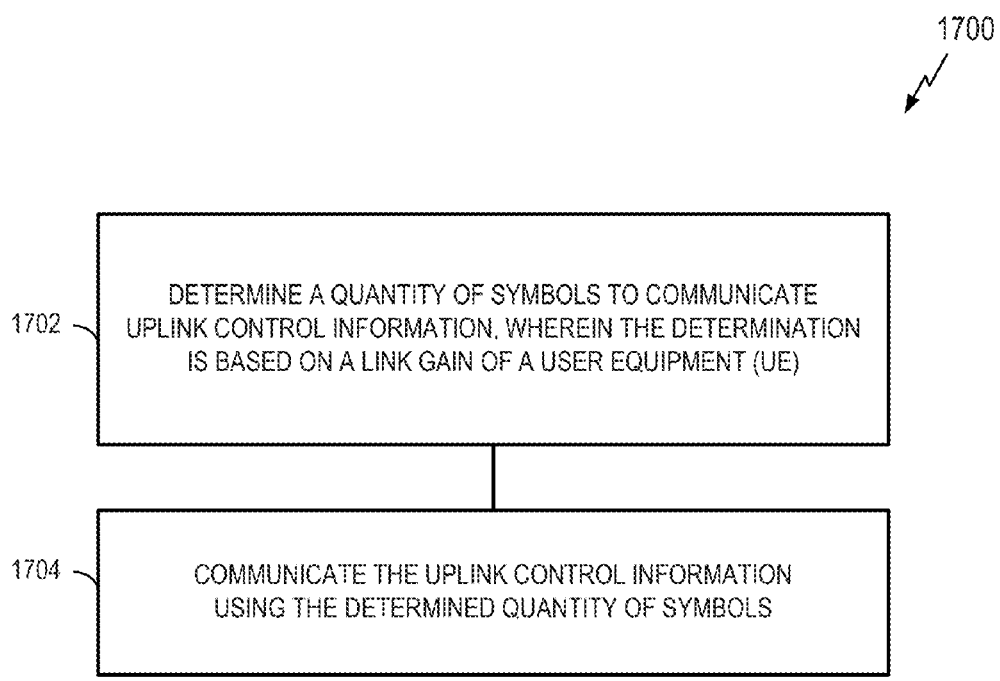
FIG. 17 is a flowchart illustrating an example of a process for communicating uplink (UL) control information in accordance with some aspects of the disclosure.

FIG. 17 illustrates a process 1700 for communication in accordance with some aspects of the disclosure. The process 1700 may take place within a processing circuit (e.g., the processing circuit 1610 of FIG. 16), which may be located in a UE, a BS, or some other suitable apparatus. Of course, in various aspects within the scope of the disclosure, the process 1700 may be implemented by any suitable apparatus capable of supporting communication-related operations.

At block 1702, an apparatus (e.g., a UE or BS) determines a quantity of symbols to communicate uplink control information. In some aspects, the determination may be based on a link gain of a user equipment (UE). For example, a larger number of symbols may be used if the link gain is lower. In some aspects, the link gain may depend on a path loss associated with the UE and/or an angle of arrival of a signal from the UE to a base station.

The uplink control information may take various forms. In some aspects, the uplink control information may include at least one of: channel quality information, precoding matrix information, a scheduling request, acknowledgement information, or any combination thereof.

In some aspects, the uplink control information may include channel information for different beams. In some aspects, the channel information may include at least one of: a received signal strength indicator, reference signal received power, reference signal received quality, narrowband channel quality information, or any combination thereof. In some aspects, the different beams may be for neighboring cells. In some aspects, the channel information may include reference signal received power of the different beams. In some aspects, a quantity of the different beams may be determined based on the link gain of the UE. In some aspects, the different beams may be used to communicate at least one of: a beam reference signal, a channel state information reference signal, or any combination thereof. In some aspects, the beam reference signal may be communicated during a synchronization sub-frame.

In some aspects, the determination of the quantity of symbols may include determining the link gain and selecting the quantity of symbols based on the determined link gain. In some aspects, the determination of the quantity of symbols may include receiving an indication of the quantity of symbols.

In some implementations, the circuit/module for determining a quantity of symbols based on link gain 1620 of FIG. 16 performs the operations of block 1702. In some implementations, the code for determining a quantity of symbols based on link gain 1630 of FIG. 16 is executed to perform the operations of block 1702.

At block 1704, the apparatus (e.g., a UE or BS) communicates (e.g., sends or receives) the uplink control information using the determined quantity of symbols. For example, a UE may transmit the uplink control information. As another example, a BS may receive the uplink control information. In some aspects, the communication may be beamformed communication.

In some implementations, the circuit/module for communicating 1622 of FIG. 16 performs the operations of block 1704. In some implementations, the code for communicating 1632 of FIG. 16 is executed to perform the operations of block 1704.

Second Example Process

Figure 18:
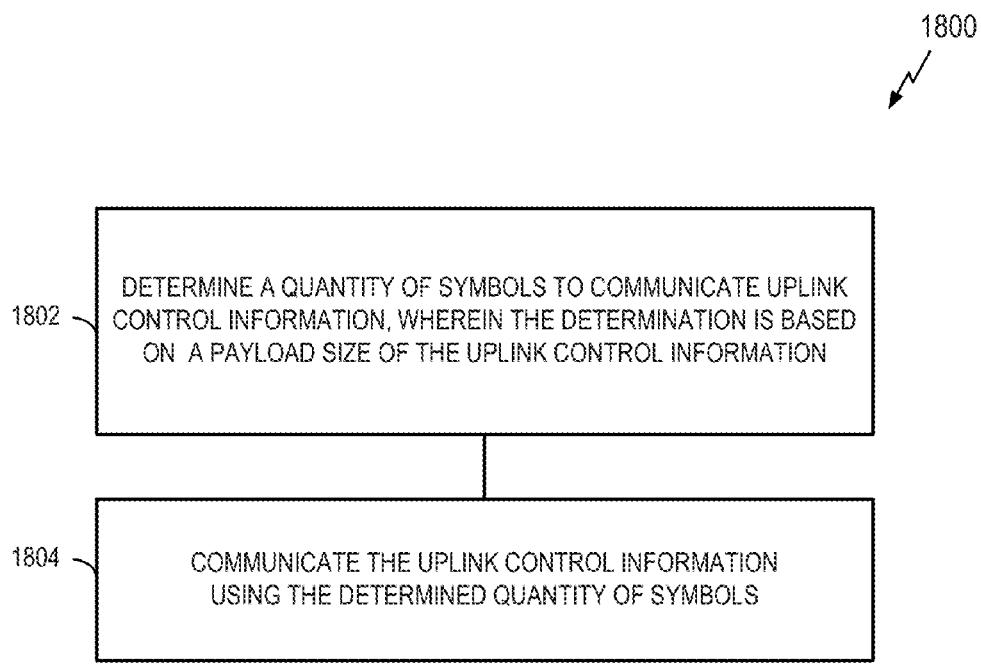
FIG. 18 is a flowchart illustrating an example of another process for communicating uplink (UL) control information in accordance with some aspects of the disclosure.

FIG. 18 illustrates a process 1800 for communication in accordance with some aspects of the disclosure. In some aspects, the process 1800 may be performed in conjunction with (e.g., as part of or in addition to) the process 1700 of FIG. 17. The process 1800 may take place within a processing circuit (e.g., the processing circuit 1610 of FIG. 16), which may be located in a UE, a BS, or some other suitable apparatus. Of course, in various aspects within the scope of the disclosure, the process 1800 may be implemented by any suitable apparatus capable of supporting communication-related operations.

At block 1802, an apparatus (e.g., a UE or BS) determines a quantity of symbols to communicate uplink control information. In some aspects, the determination may be based on a payload size of the uplink control information. For example, a larger number of symbols may be used if the payload size is higher. This stands in contrast, for example, to conventional systems (e.g., LTE) where the same number of symbols is used irrespective of the payload size (e.g., where the coding is changed to accommodate different payload sizes). The uplink control information may take various forms (e.g., as discussed above in conjunction with block 1702).

In some aspects, the determination of the quantity of symbols may include determining the payload size and selecting the quantity of symbols based on the determined payload size. In some aspects, the determination of the quantity of symbols may include receiving an indication of the quantity of symbols.

In some implementations, the circuit/module for determining a quantity of symbols based on payload size 1628 of FIG. 16 performs the operations of block 1802. In some implementations, the code for determining a quantity of symbols based on payload size 1638 of FIG. 16 is executed to perform the operations of block 1802.

At block 1804, the apparatus (e.g., a UE or BS) communicates (e.g., sends or receives) the uplink control information using the determined quantity of symbols. For example, a UE may transmit the uplink control information. As another example, a BS may receive the uplink control information. In some aspects, the communication may be beamformed communication.

In some implementations, the circuit/module for communicating 1622 of FIG. 16 performs the operations of block 1804. In some implementations, the code for communicating 1632 of FIG. 16 is executed to perform the operations of block 1804.

Third Example Process

Figure 19:
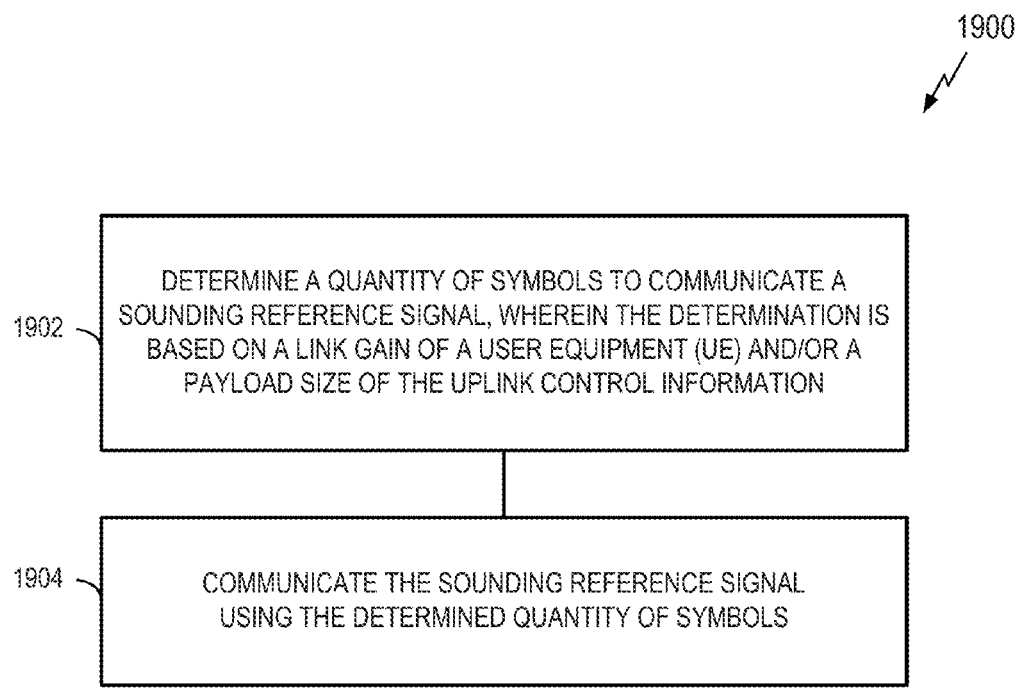
FIG. 19 is a flowchart illustrating an example of another process for communicating an SRS in accordance with some aspects of the disclosure.

FIG. 19 illustrates a process 1900 for communication in accordance with some aspects of the disclosure. In some aspects, the process 1900 may be performed in conjunction with (e.g., as part of or in addition to) the process 1700 of FIG. 17 and/or the process 1800 of FIG. 18. The process 1900 may take place within a processing circuit (e.g., the processing circuit 1610 of FIG. 16), which may be located in a UE, a BS, or some other suitable apparatus. Of course, in various aspects within the scope of the disclosure, the process 1900 may be implemented by any suitable apparatus capable of supporting communication-related operations.

At block 1902, an apparatus (e.g., a UE or BS) determines a quantity of symbols to communicate a sounding reference signal. In some aspects, the determination may be based on a link gain of a user equipment (UE) and/or a payload size of the uplink control information. In some aspects, the link gain depends on a path loss associated with the UE and an angle of arrival of a signal from the UE to a base station.

In some implementations, the circuit/module for determining a quantity of symbols based on link gain 1620 of FIG. 16 performs the operations of block 1902. In some implementations, the code for determining a quantity of symbols based on link gain 1630 of FIG. 16 is executed to perform the operations of block 1902.

At block 1904, the apparatus (e.g., a UE or BS) communicates (e.g., sends or receives) the sounding reference signal using the determined quantity of symbols. For example, a UE may transmit the sounding reference signal. As another example, a BS may receive the sounding reference signal. In some aspects, the communication may be beamformed communication.

In some implementations, the circuit/module for communicating 1622 of FIG. 16 performs the operations of block 1904. In some implementations, the code for communicating 1632 of FIG. 16 is executed to perform the operations of block 1904.

Fourth Example Process

Figure 20:
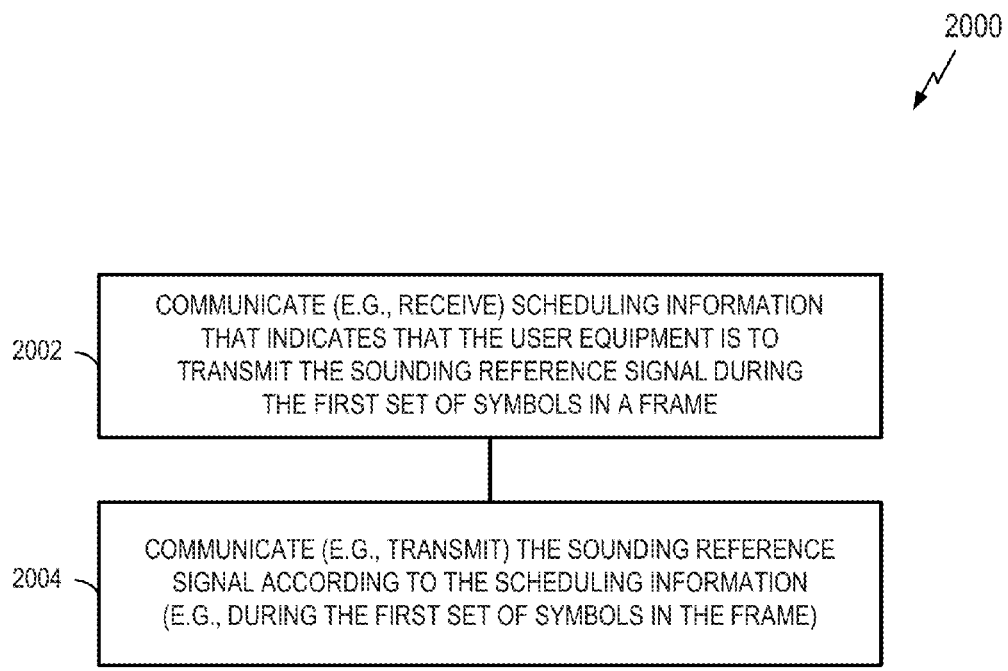
FIG. 20 is a flowchart illustrating an example of a process for communicating an SRS in accordance with some aspects of the disclosure.

FIG. 20 illustrates a process 2000 for communication in accordance with some aspects of the disclosure. In some aspects, the process 2000 may be performed in conjunction with (e.g., as part of or in addition to) the process 1700 of FIG. 17 and/or the process 1800 of FIG. 18. The process 2000 may take place within a processing circuit (e.g., the processing circuit 1610 of FIG. 16), which may be located in a UE, a BS, or some other suitable apparatus. Of course, in various aspects within the scope of the disclosure, the process 2000 may be implemented by any suitable apparatus capable of supporting communication-related operations.

At block 2002, an apparatus (e.g., a UE) communicates scheduling information. For example, a UE may receive the scheduling information from a BS. In some aspects, the scheduling information may indicate that the user equipment is to transmit the sounding reference signal during a particular set of symbols in a frame (e.g., the first set of symbols in the frame).

In some implementations, the circuit/module for communicating 1622 of FIG. 16 performs the operations of block 2002. In some implementations, the code for communicating 1632 of FIG. 16 is executed to perform the operations of block 2002.

At block 2004, the apparatus communicates the sounding reference signal according to the scheduling information received at block 2002 (e.g., during the first set of symbols in the frame).

In some implementations, the circuit/module for communicating 1622 of FIG. 16 performs the operations of block 2004. In some implementations, the code for communicating 1632 of FIG. 16 is executed to perform the operations of block 2004.

Fifth Example Process

Figure 21:
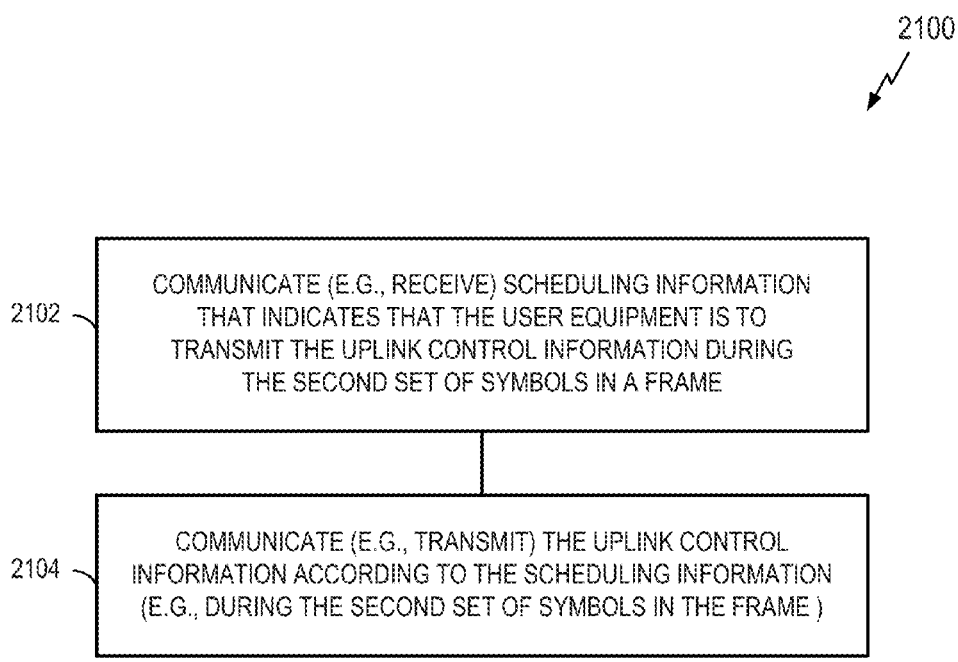
FIG. 21 is a flowchart illustrating an example of a process for transmitting UL control information in accordance with some aspects of the disclosure.

FIG. 21 illustrates a process 2100 for communication in accordance with some aspects of the disclosure. In some aspects, the process 2100 may be performed in conjunction with (e.g., as part of or in addition to) the process 1700 of FIG. 17 and/or the process 1800 of FIG. 18. The process 2100 may take place within a processing circuit (e.g., the processing circuit 1610 of FIG. 16), which may be located in a UE, a BS, or some other suitable apparatus. Of course, in various aspects within the scope of the disclosure, the process 2100 may be implemented by any suitable apparatus capable of supporting communication-related operations.

At block 2102, an apparatus (e.g., a UE) communicates scheduling information. For example, a UE may receive the scheduling information from a BS. In some aspects, the scheduling information may indicate that a user equipment is to transmit the uplink control information during a particular set of symbols in a frame (e.g., the second set of symbols in the frame).

In some implementations, the circuit/module for communicating 1622 of FIG. 16 performs the operations of block 2102. In some implementations, the code for communicating 1632 of FIG. 16 is executed to perform the operations of block 2102.

At optional block 2104, the apparatus communicates the uplink control information according to the scheduling information received at block 2102 (e.g., during the second set of symbols in the frame).

In some implementations, the circuit/module for communicating 1622 of FIG. 16 performs the operations of block 2104. In some implementations, the code for communicating 1632 of FIG. 16 is executed to perform the operations of block 2104.

Sixth Example Process

Figure 22:
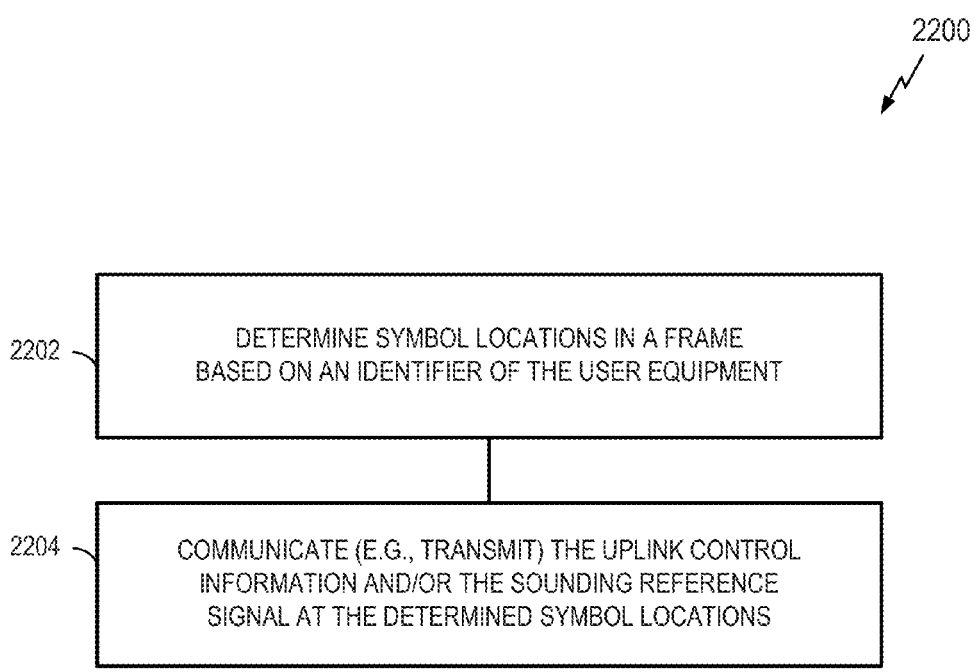
FIG. 22 is a flowchart illustrating an example of a process for transmitting information at particular symbol locations in accordance with some aspects of the disclosure.

FIG. 22 illustrates a process 2200 for communication in accordance with some aspects of the disclosure. In some aspects, the process 2200 may be performed in conjunction with (e.g., as part of or in addition to) the process 1700 of FIG. 17 and/or the process 1800 of FIG. 18. The process 2200 may take place within a processing circuit (e.g., the processing circuit 1610 of FIG. 16), which may be located in a UE, a BS, or some other suitable apparatus. Of course, in various aspects within the scope of the disclosure, the process 2200 may be implemented by any suitable apparatus capable of supporting communication-related operations.

At block 2202, an apparatus (e.g., a UE) determines symbol locations in the frame based on an identifier of the user equipment. For example, certain UE identifiers may be mapped to particular symbol locations.

In some implementations, the circuit/module for determining symbol locations 1624 of FIG. 16 performs the operations of block 2202. In some implementations, the code for determining symbol locations 1634 of FIG. 16 is executed to perform the operations of block 2202.

At block 2204, the apparatus communicates the uplink control information and/or the sounding reference signal at the determined symbol locations. For example, a UE may transmit the uplink control information and/or the sounding reference signal at the symbol locations determined at block 2202.

In some implementations, the circuit/module for communicating 1622 of FIG. 16 performs the operations of block 2204. In some implementations, the code for communicating 1632 of FIG. 16 is executed to perform the operations of block 2204.

Seventh Example Process

Figure 23:
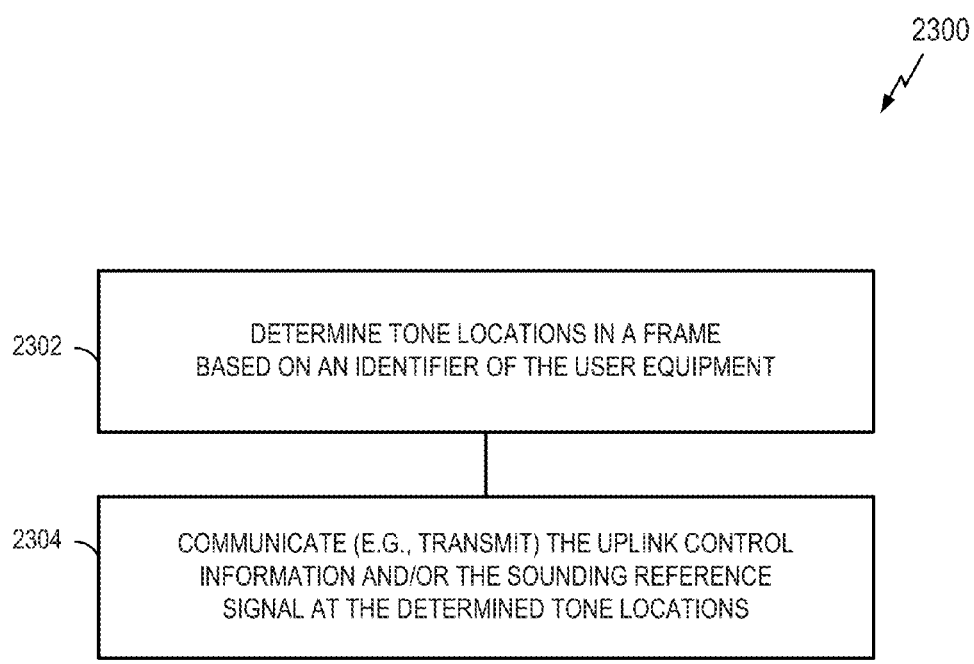
FIG. 23 is a flowchart illustrating an example of a process for transmitting information at particular tone locations in accordance with some aspects of the disclosure.

FIG. 23 illustrates a process 2300 for communication in accordance with some aspects of the disclosure. In some aspects, the process 2300 may be performed in conjunction with (e.g., as part of or in addition to) the process 1700 of FIG. 17 and/or the process 1800 of FIG. 18. The process 2300 may take place within a processing circuit (e.g., the processing circuit 1610 of FIG. 16), which may be located in a UE, a BS, or some other suitable apparatus. Of course, in various aspects within the scope of the disclosure, the process 2300 may be implemented by any suitable apparatus capable of supporting communication-related operations.

At block 2302, an apparatus (e.g., a UE) determines tone locations in the frame based on an identifier of the user equipment. For example, certain UE identifiers may be mapped to particular tone locations.

In some implementations, the circuit/module for determining tone locations 1626 of FIG. 16 performs the operations of block 2302. In some implementations, the code for determining tone locations 1636 of FIG. 16 is executed to perform the operations of block 2302.

At block 2304, the apparatus communicates the uplink control information and/or the sounding reference signal at the determined tone locations. For example, a UE may transmit the uplink control information and/or the sounding reference signal at the symbol locations determined at block 2302.

In some implementations, the circuit/module for communicating 1622 of FIG. 16 performs the operations of block 2304. In some implementations, the code for communicating 1632 of FIG. 16 is executed to perform the operations of block 2304.

Eighth Example Process

Figure 24:
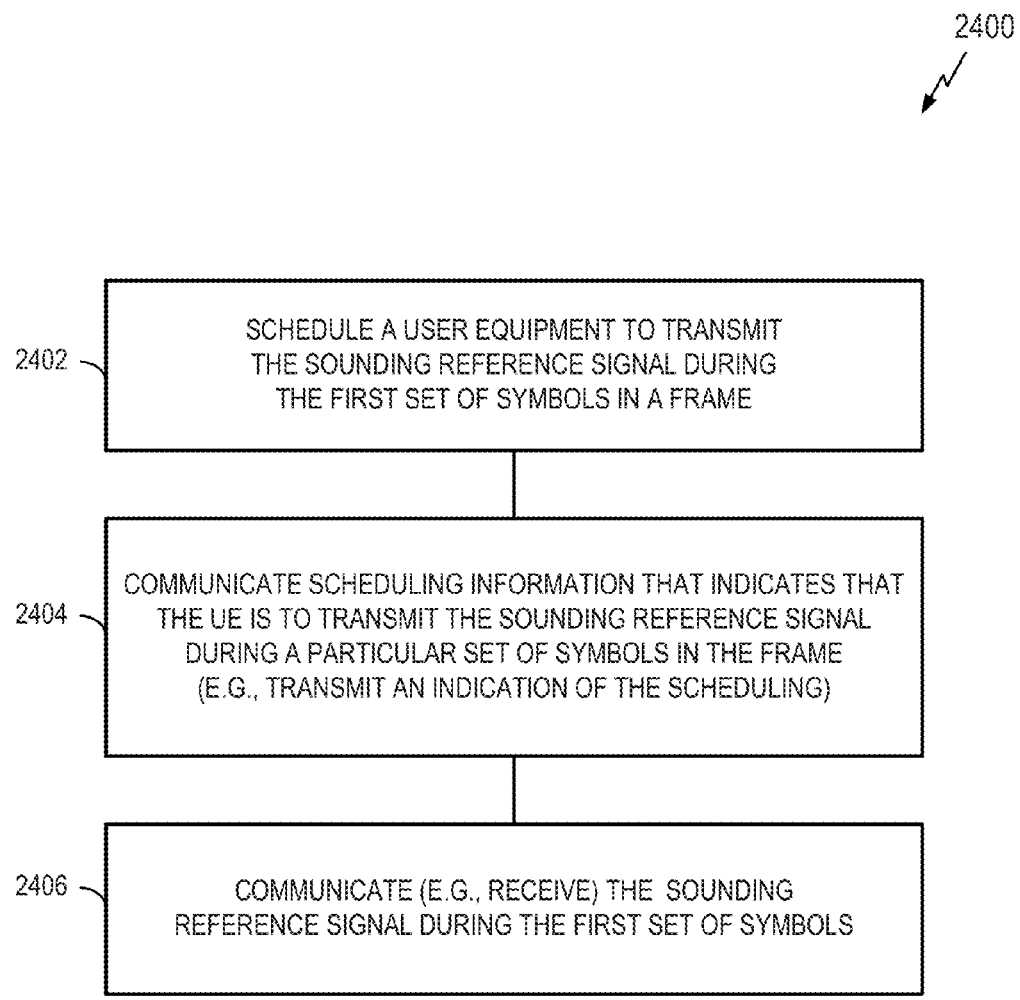
FIG. 24 is a flowchart illustrating an example of a process for sending a scheduling indication in accordance with some aspects of the disclosure.

FIG. 24 illustrates a process 2400 for communication in accordance with some aspects of the disclosure. In some aspects, the process 2400 may be performed in conjunction with (e.g., as part of or in addition to) the process 1700 of FIG. 17 and/or the process 1800 of FIG. 18. The process 2400 may take place within a processing circuit (e.g., the processing circuit 1610 of FIG. 16), which may be located in a BS, a UE, or some other suitable apparatus. Of course, in various aspects within the scope of the disclosure, the process 2400 may be implemented by any suitable apparatus capable of supporting communication-related operations.

At block 2402, an apparatus (e.g., a BS) schedules a user equipment to transmit the sounding reference signal during the first set of symbols in a frame.

In some implementations, the circuit/module for determining symbol locations 1624 of FIG. 16 performs the operations of block 2402. In some implementations, the code for determining symbol locations 1634 of FIG. 16 is executed to perform the operations of block 2402.

At block 2404, the apparatus communicates scheduling information that indicates that a UE is to transmit the sounding reference signal during a particular set of symbols in a frame. For example, a BS may transmit an indication of the scheduling of block 2402.

In some implementations, the circuit/module for communicating 1622 of FIG. 16 performs the operations of block 2404. In some implementations, the code for communicating 1632 of FIG. 16 is executed to perform the operations of block 2404.

At block 2406, the apparatus communicates the sounding reference signal during indicated set of symbols in a frame. For example, a BS may receive the sounding reference signal during the first set of symbols.

In some implementations, the circuit/module for communicating 1622 of FIG. 16 performs the operations of block 2406. In some implementations, the code for communicating 1632 of FIG. 16 is executed to perform the operations of block 2406.

Ninth Example Process

Figure 25:
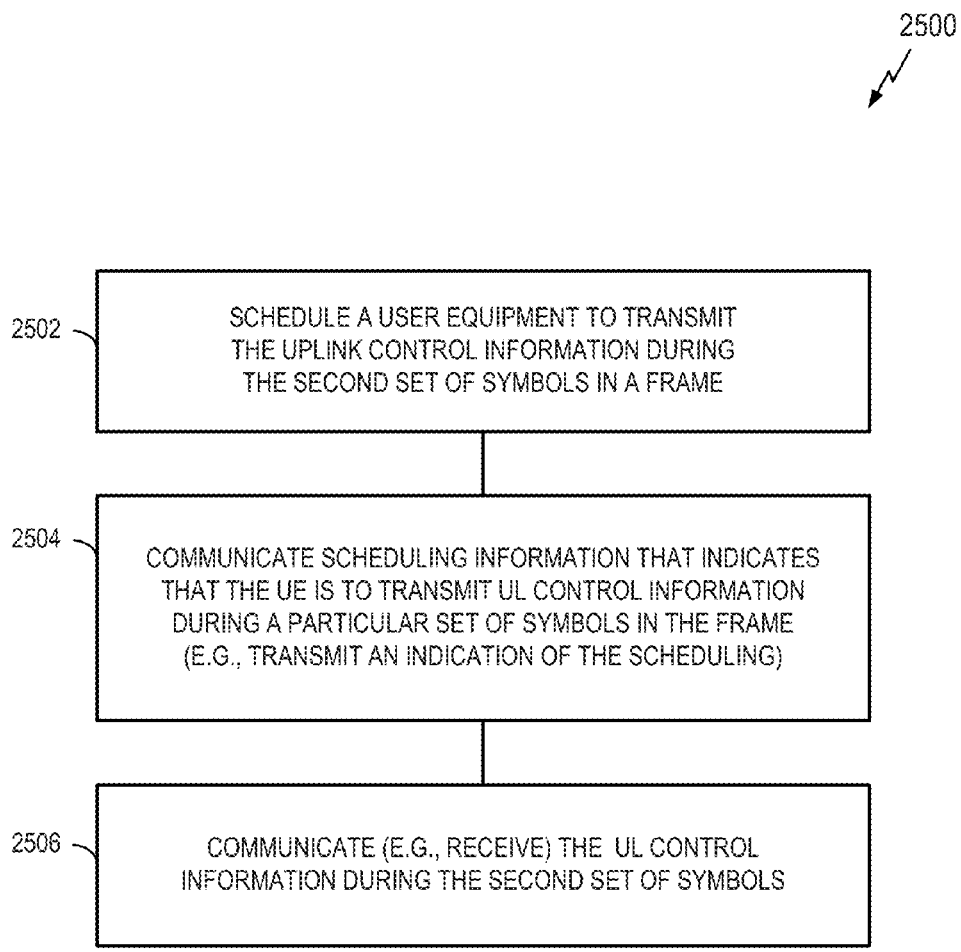
FIG. 25 is a flowchart illustrating an example of another process for sending a scheduling indication in accordance with some aspects of the disclosure.

FIG. 25 illustrates a process 2500 for communication in accordance with some aspects of the disclosure. In some aspects, the process 2500 may be performed in conjunction with (e.g., as part of or in addition to) the process 1700 of FIG. 17 and/or the process 1800 of FIG. 18. The process 2500 may take place within a processing circuit (e.g., the processing circuit 1610 of FIG. 16), which may be located in a BS, a UE, or some other suitable apparatus. Of course, in various aspects within the scope of the disclosure, the process 2500 may be implemented by any suitable apparatus capable of supporting communication-related operations.

At block 2502, an apparatus (e.g., a BS) schedules a user equipment to transmit the uplink control information during the second set of symbols in the frame.

In some implementations, the circuit/module for determining symbol locations 1624 of FIG. 16 performs the operations of block 2502. In some implementations, the code for determining symbol locations 1634 of FIG. 16 is executed to perform the operations of block 2502.

At block 2504, the apparatus communicates scheduling information that indicates that a UE is to transmit the uplink control information during a particular set of symbols in a frame. For example, a BS may transmit an indication of the scheduling of block 2502.

In some implementations, the circuit/module for communicating 1622 of FIG. 16 performs the operations of block 2504. In some implementations, the code for communicating 1632 of FIG. 16 is executed to perform the operations of block 2504.

At block 2506, the apparatus communicates the uplink control information during indicated set of symbols in a frame. For example, a BS may receive the uplink control information during the second set of symbols.

In some implementations, the circuit/module for communicating 1622 of FIG. 16 performs the operations of block 2506. In some implementations, the code for communicating 1632 of FIG. 16 is executed to perform the operations of block 2506.

Tenth Example Process

Figure 26:
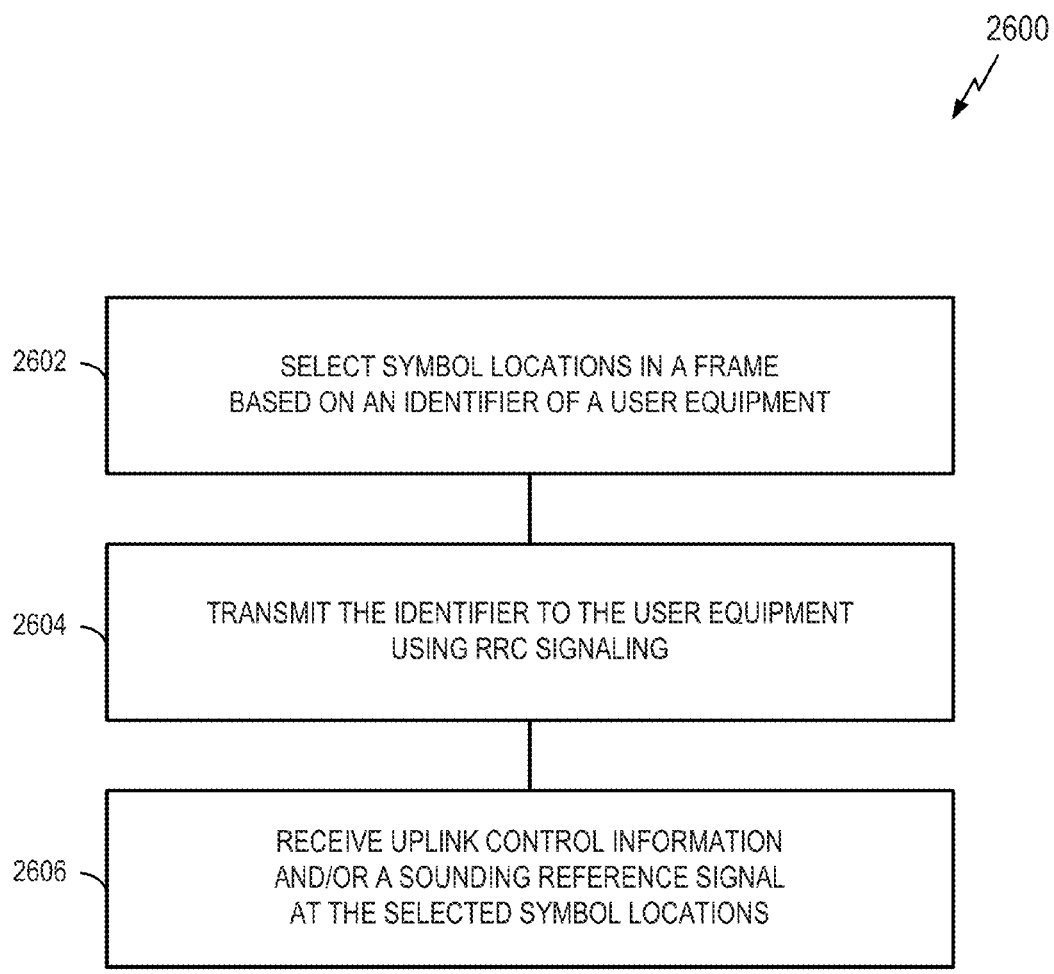
FIG. 26 is a flowchart illustrating an example of a process for communicating via particular symbol locations in accordance with some aspects of the disclosure.

FIG. 26 illustrates a process 2600 for communication in accordance with some aspects of the disclosure. In some aspects, the process 2600 may be performed in conjunction with (e.g., as part of or in addition to) the process 1700 of FIG. 17 and/or the process 1800 of FIG. 18. The process 2600 may take place within a processing circuit (e.g., the processing circuit 1610 of FIG. 16), which may be located in a BS, a UE, or some other suitable apparatus. Of course, in various aspects within the scope of the disclosure, the process 2600 may be implemented by any suitable apparatus capable of supporting communication-related operations.

At block 2602, an apparatus (e.g., a BS) selects symbol locations in the frame based on an identifier of a user equipment.

In some implementations, the circuit/module for determining symbol locations 1624 of FIG. 16 performs the operations of block 26402. In some implementations, the code for determining symbol locations 1634 of FIG. 16 is executed to perform the operations of block 2602.

At block 2604, the apparatus transmits the identifier to the user equipment using radio resource control (RRC) signaling.

In some implementations, the circuit/module for communicating 1622 of FIG. 16 performs the operations of block 2604. In some implementations, the code for communicating 1632 of FIG. 16 is executed to perform the operations of block 2604.

At block 2606, the apparatus receives uplink control information and/or a sounding reference signal at the selected symbol locations.

In some implementations, the circuit/module for communicating 1622 of FIG. 16 performs the operations of block 2606. In some implementations, the code for communicating 1632 of FIG. 16 is executed to perform the operations of block 2606.

Eleventh Example Process

Figure 27:
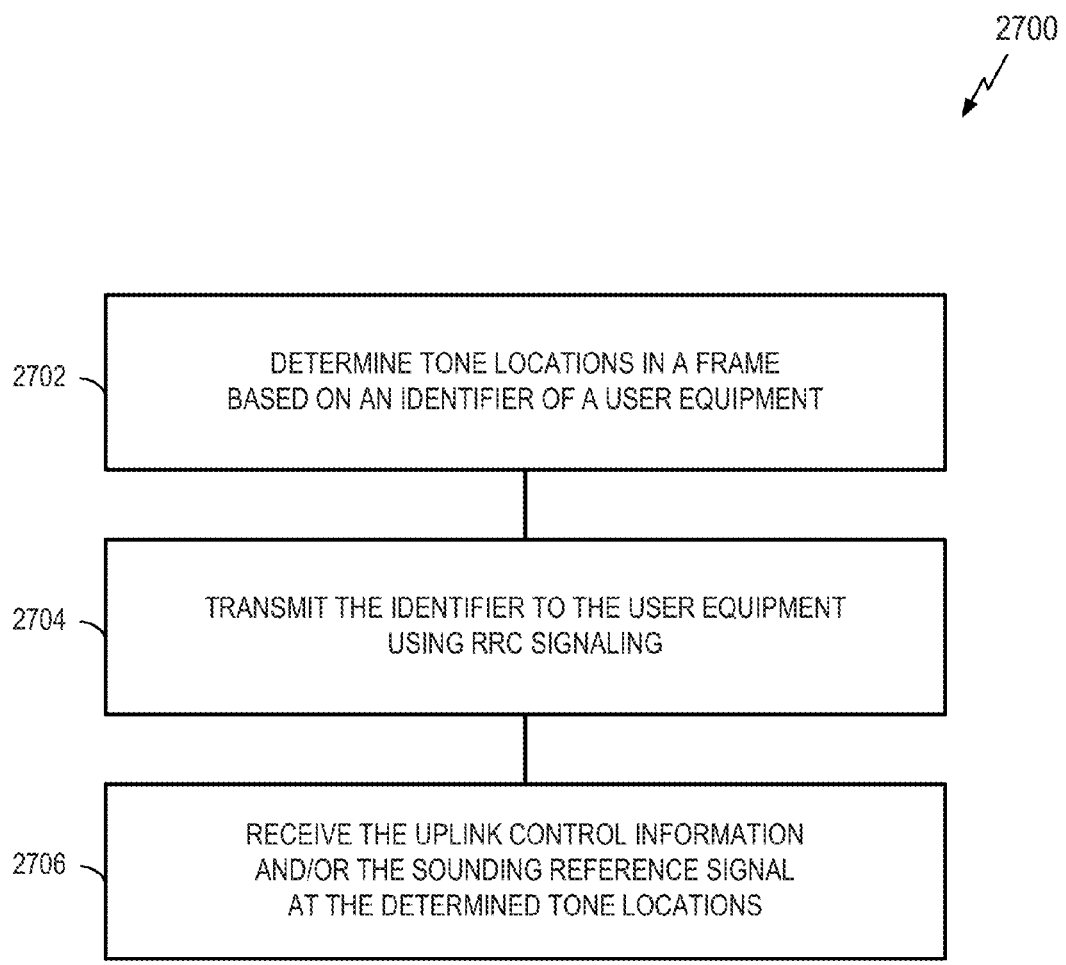
FIG. 27 is a flowchart illustrating an example of a process for communicating via particular tone locations in accordance with some aspects of the disclosure.

FIG. 27 illustrates a process 2700 for communication in accordance with some aspects of the disclosure. In some aspects, the process 2700 may be performed in conjunction with (e.g., as part of or in addition to) the process 1700 of FIG. 17 and/or the process 1800 of FIG. 18. The process 2700 may take place within a processing circuit (e.g., the processing circuit 1610 of FIG. 16), which may be located in a BS, a UE, or some other suitable apparatus. Of course, in various aspects within the scope of the disclosure, the process 2700 may be implemented by any suitable apparatus capable of supporting communication-related operations.

At block 2702, an apparatus (e.g., a BS) determines tone locations in the frame based on an identifier of a user equipment.

In some implementations, the circuit/module for determining tone locations 1626 of FIG. 16 performs the operations of block 2702. In some implementations, the code for determining tone locations 1636 of FIG. 16 is executed to perform the operations of block 2702.

At block 2704, the apparatus transmits the identifier to the user equipment using RRC signaling.

In some implementations, the circuit/module for communicating 1622 of FIG. 16 performs the operations of block 2704. In some implementations, the code for communicating 1632 of FIG. 16 is executed to perform the operations of block 2704.

At block 2706, the apparatus receives the uplink control information and/or the sounding reference signal at the determined tone locations.

In some implementations, the circuit/module for communicating 1622 of FIG. 16 performs the operations of block 2706. In some implementations, the code for communicating 1632 of FIG. 16 is executed to perform the operations of block 2706.

Twelfth Example Process

Figure 28:
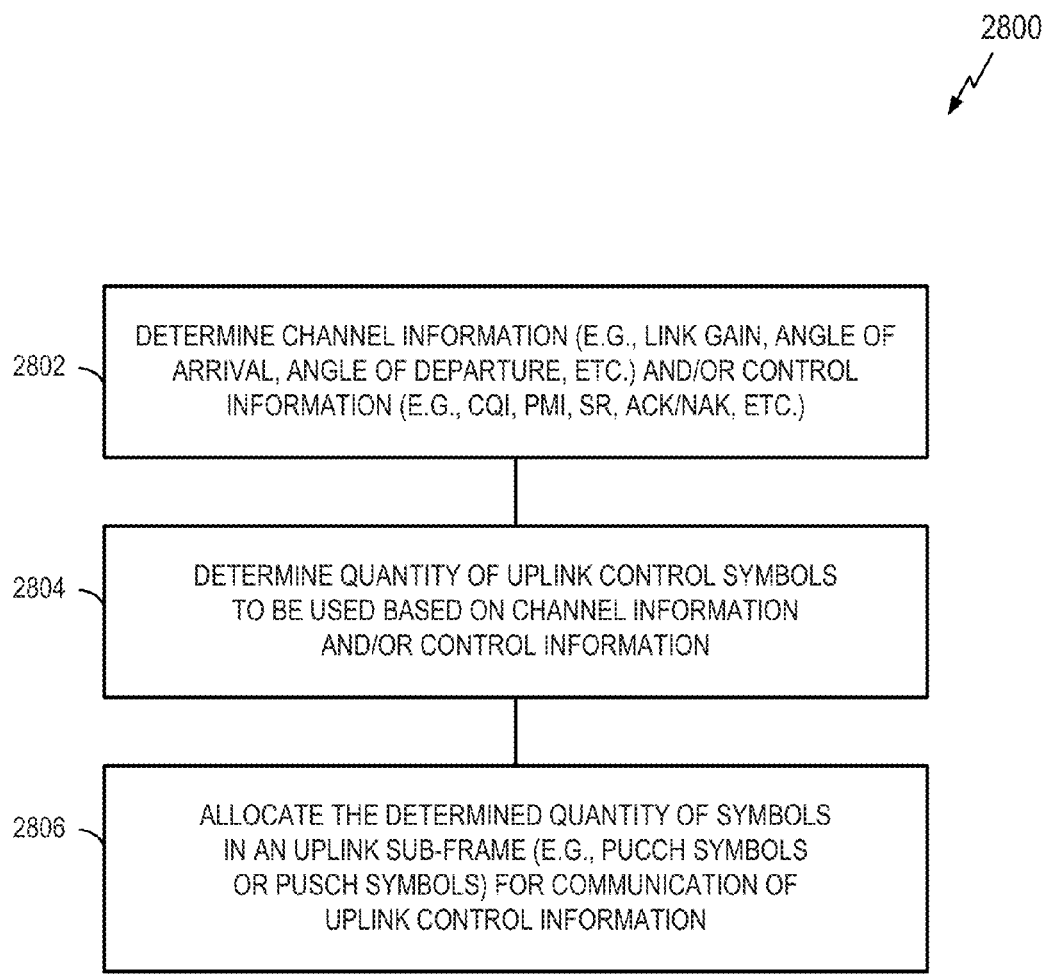
FIG. 28 is a flowchart illustrating an example of a process for allocating symbols in accordance with some aspects of the disclosure.

FIG. 28 illustrates a process 2800 for communication in accordance with some aspects of the disclosure. In some aspects, the process 2800 may be performed in conjunction with (e.g., as part of or in addition to) the process 1700 of FIG. 17 and/or the process 1800 of FIG. 18. The process 2800 may take place within a processing circuit (e.g., the processing circuit 1610 of FIG. 16), which may be located in a BS, a UE, or some other suitable apparatus. Of course, in various aspects within the scope of the disclosure, the process 2800 may be implemented by any suitable apparatus capable of supporting communication-related operations.

At block 2802, an apparatus (e.g., a BS) determines channel information and/or control information. For example, a BS may determine, for a particular UE, at least one of: link gain, angle of arrival, angel of departure, or any combination thereof. As another example, a BS may receive, for a particular UE, at least one of: CQI, PNI, SR, ACK/NAK, or any combination thereof.

In some implementations, the circuit/module for communicating 1622 of FIG. 16 performs the operations of block 2802. In some implementations, the code for communicating 1632 of FIG. 16 is executed to perform the operations of block 2802.

At block 2804, the apparatus determines a quantity of UL control symbols to be used based on the channel information and/or the control information received at block 2802.

In some implementations, the circuit/module for determining a quantity of symbols based on link gain 1620 of FIG. 16 performs the operations of block 2804. In some implementations, the code for determining a quantity of symbols based on link gain 1630 of FIG. 16 is executed to perform the operations of block 2804.

In some implementations, the circuit/module for determining a quantity of symbols based on payload size 1628 of FIG. 16 performs the operations of block 2804. In some implementations, the code for determining a quantity of symbols based on payload size 1638 of FIG. 16 is executed to perform the operations of block 2804.

At block 2806, the apparatus allocates the determined quantity of symbols in an UL sub-frame for communication of UL control information. In some aspects, the allocation may allocate PUCCH symbols or PUSCH symbols.

In some implementations, the circuit/module for determining symbol locations 1624 of FIG. 16 performs the operations of block 2806. In some implementations, the code for determining symbol locations 1634 of FIG. 16 is executed to perform the operations of block 2806.

Second Example Apparatus

Figure 29:
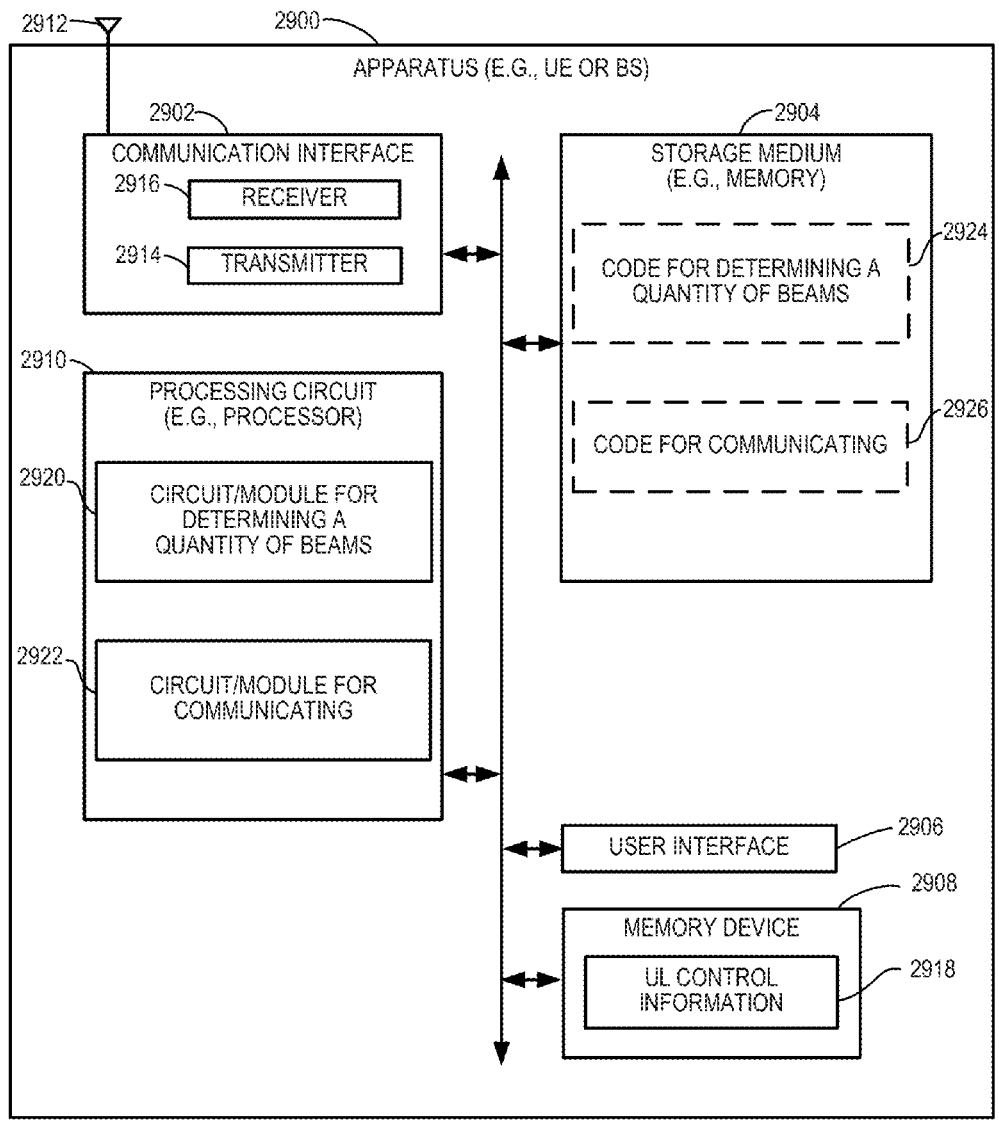
FIG. 29 is a block diagram illustrating an example hardware implementation for another apparatus (e.g., an electronic device) that can support communication in accordance with some aspects of the disclosure.

FIG. 29 illustrates a block diagram of an example hardware implementation of an apparatus 2900 configured to communicate according to one or more aspects of the disclosure. The apparatus 2900 could embody or be implemented within a BS, a UE, or some other type of device that supports wireless communication. In various implementations, the apparatus 2900 could embody or be implemented within an access terminal, an access point, or some other type of device. In various implementations, the apparatus 2900 could embody or be implemented within a mobile phone, a smart phone, a tablet, a portable computer, a server, a personal computer, a sensor, an entertainment device, a medical device, or any other electronic device having circuitry.

The apparatus 2900 includes a communication interface (e.g., at least one transceiver) 2902, a storage medium 2904, a user interface 2906, a memory device 2908 (e.g., storing uplink control information 2918), and a processing circuit 2910 (e.g., at least one processor). In various implementations, the user interface 2906 may include one or more of: a keypad, a display, a speaker, a microphone, a touchscreen display, of some other circuitry for receiving an input from or sending an output to a user. The communication interface 2902 may be coupled to one or more antennas 2912, and may include a transmitter 2914 and a receiver 2916. In general, the components of FIG. 29 may be similar to corresponding components of the apparatus 1600 of FIG. 16.

According to one or more aspects of the disclosure, the processing circuit 2910 may be adapted to perform any or all of the features, processes, functions, operations and/or routines for any or all of the apparatuses described herein. For example, the processing circuit 2910 may be configured to perform any of the steps, functions, and/or processes described with respect to FIGS. 30-35. As used herein, the term "adapted" in relation to the processing circuit 2910 may refer to the processing circuit 2910 being one or more of configured, employed, implemented, and/or programmed to perform a particular process, function, operation and/or routine according to various features described herein.

The processing circuit 2910 may be a specialized processor, such as an application-specific integrated circuit (ASIC) that serves as a means for (e.g., structure for) carrying out any one of the operations described in conjunction with FIGS. 30-35. The processing circuit 2910 serves as one example of a means for transmitting and/or a means for receiving. In various implementations, the processing circuit 2910 may incorporate the functionality of the UE 202 (e.g., the processor 214) or the base station 204 (e.g., the processor 208) of FIG. 2, the UE 302 (e.g., the processor 314) or the base station 304 (e.g., the processor 308) of FIG. 3, or the UE 402 or the base station 406 of FIG. 4.

According to at least one example of the apparatus 2900, the processing circuit 2910 may include one or more of a circuit/module for determining a quantity of beams 2920 or a circuit/module for communicating 2922. In various implementations, the circuit/module for determining a quantity of beams 2920 or the circuit/module for communicating 2922 may correspond, at least in part, to the functionality of the UE 202 (e.g., the processor 214) or the base station 204 (e.g., the processor 208) of FIG. 2, the UE 302 (e.g., the processor 314) or the base station 304 (e.g., the processor 308) of FIG. 3, or the UE 402 or the base station 406 of FIG. 4.

As mentioned above, programming stored by the storage medium 2904, when executed by the processing circuit 2910, causes the processing circuit 2910 to perform one or more of the various functions and/or process operations described herein. For example, the programming, when executed by the processing circuit 2910, may cause the processing circuit 2910 to perform the various functions, steps, and/or processes described herein with respect to FIGS. 30-35 in various implementations. As shown in FIG. 29, the storage medium 2904 may include one or more of code for determining a quantity of beams 2924 or code for communicating 2926. In various implementations, the code for determining a quantity of beams 2924 or the code for communicating 2926 may be executed or otherwise used to provide the functionality described herein for the circuit/module for determining a quantity of beams 2920 or the circuit/module for communicating 2922.

The circuit/module for determining a quantity of beams 2920 may include circuitry and/or programming (e.g., code for determining a quantity of beams 2924 stored on the storage medium 2904) adapted to perform several functions relating to, for example, determining a quantity of beams for which channel information is transmitted to a base station. In some aspects, the determination may be based on a type of channel used to carry uplink control information.

In some implementations, the circuit/module for determining a quantity of beams 2920 obtains an indication of the type of channel to be used to carry the uplink control information (e.g., from the circuit/module for communicating 2922, the memory device 2908, the communication interface 2902, the receiver 2916, or some other component) or determines the type of channel itself. The circuit/module for determining a quantity of beams 2920 then uses a channel type-to-number table or some other suitable mapping to determine the number of beams that should have channel information fed-back in view of the type of channel being used to carry uplink control information. The circuit/module for determining a quantity of beams 2920 then outputs an indication of the determined quantity of beams (e.g., to the circuit/module for communicating 2922, the memory device 2908, the communication interface 2902, the transmitter 2914, or some other component).

In some implementations, the circuit/module for determining a quantity of beams 2920 directly obtains an indication of the quantity of beams (e.g., from the circuit/module for communicating 2922, the memory device 2908, the communication interface 2902, the receiver 2916, or some other component). For example, the circuit/module for determining a quantity of beams 2920 may identify a memory location in the memory device 2908 that stores the quantity information and invokes a read of that location to obtain the information. The circuit/module for determining a quantity of beams 2920 then outputs the information (e.g., sends the information to the circuit/module for communicating 2922, sends the information to a process, or sends the information to another component of the apparatus 2900).

The circuit/module for communicating 2922 may include circuitry and/or programming (e.g., code for communicating 2926 stored on the storage medium 2904) adapted to perform several functions relating to, for example, communicating information. In some implementations, the communication involves receiving the information. In some implementations, the communication involves sending (e.g., transmitting) the information.

The information may take different forms in different scenarios. In some aspects, the circuit/module for communicating 2922 may communicate uplink control information (e.g., at particular symbol locations during a frame and/or at particular tone locations during a frame). In some aspects, the circuit/module for communicating 2922 may communicate an indication that indicates whether a UE is to transmit uplink control information via PUCCH or PUSCH. In some aspects, the circuit/module for communicating 2922 may communicate an indication of a quantity of beams for which channel information is to be transmitted (e.g., to a base station).

The communication may involve different signaling in different scenarios. In some aspects, the circuit/module for communicating 2922 may communicate information via radio resource control (RRC) signaling. In some aspects, the circuit/module for communicating 2922 may communicate information via a physical downlink control channel (PDCCH). In some aspects, the circuit/module for communicating 2922 may communicate information via downlink control information (DCI).

In some implementation, the circuit/module for communicating 2922 may use one or more parameters for the communicating. For example, the circuit/module for communicating 2922 may obtain information about timing (e.g., symbol locations) and/or tone locations and communicate information at those locations.

In some implementations where the communicating involves receiving information, the circuit/module for communicating 2922 receives information (e.g., from the communication interface 2902, the receiver 2916, the memory device 2908, some other component of the apparatus 2900, or some other device), processes (e.g., decodes) the information, and outputs the information to another component of the apparatus 2900 (e.g., the memory device 2908 or some other component). In some scenarios (e.g., if the circuit/module for communicating 2922 includes a receiver), the communicating involves the circuit/module for communicating 2922 receiving information directly from a device that transmitted the information (e.g., via radio frequency signaling or some other type of signaling suitable for the applicable communication medium).

In some implementations where the communicating involves sending information, the circuit/module for communicating 2922 obtains information (e.g., from the memory device 2908 or some other component of the apparatus 2900), processes (e.g., encodes) the information, and outputs the processed information. In some scenarios, the communicating involves sending the information to another component of the apparatus 2900 (e.g., the transmitter 2914, the communication interface 2902, or some other component) that will transmit the information to another device. In some scenarios (e.g., if the circuit/module for communicating 2922 includes a transmitter), the communicating involves the circuit/module for communicating 2922 transmitting the information directly to another device (e.g., the ultimate destination) via radio frequency signaling or some other type of signaling suitable for the applicable communication medium.

In some implementations, the circuit/module for communicating 2922 is a transceiver. In some implementations, the circuit/module for communicating 2922 is a receiver. In some implementations, the circuit/module for communicating 2922 is a transmitter. In some implementations, the communication interface 2902 includes the circuit/module for communicating 2922 and/or the code for communicating 2926. In some implementations, the circuit/module for communicating 2922 and/or the code for communicating 2926 is configured to control the communication interface 2902 (e.g., a transceiver, a receiver, or a transmitter) to communicate the information.

Thirteenth Example Process

Figure 30:
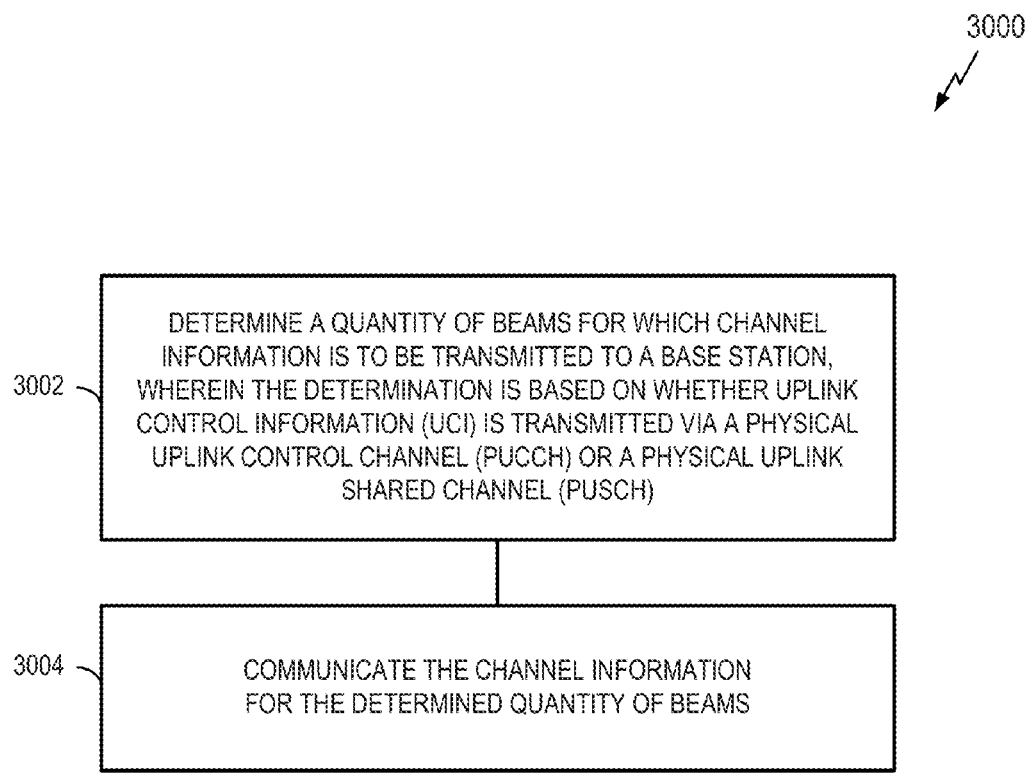
FIG. 30 is a flowchart illustrating an example of a process for communicating channel information in accordance with some aspects of the disclosure.

FIG. 30 illustrates a process 3000 for communication in accordance with some aspects of the disclosure. The process 3000 may take place within a processing circuit (e.g., the processing circuit 2910 of FIG. 29), which may be located in a BS, a UE, or some other suitable apparatus. Of course, in various aspects within the scope of the disclosure, the process 3000 may be implemented by any suitable apparatus capable of supporting communication-related operations.

At block 3002, an apparatus (e.g., a UE or a BS) determines a quantity of beams for which channel information is transmitted to a base station. In some aspects, the determination may be based on whether uplink control information (UCI) is transmitted via a physical uplink control channel (PUCCH) or a physical uplink shared channel (PUSCH). In some aspects, the beams (e.g., transmitted by a BS and received at a UE) may be used to communicate a beam reference signal during a coarse sweep and/or a fine sweep.

In some aspects, channel information for a first quantity of beams may be fed-back to the base station if the uplink control information is transmitted in the PUSCH and channel information for a second quantity of beams may be fed-back to the base station if uplink control information is transmitted in the PUCCH. Here, the first quantity is larger than the second quantity.

The channel information may take different forms in different implementations. In some aspects, the channel information may include at least one of: a received signal strength indicator, reference signal received power, reference signal received quality, narrowband channel quality information, or any combination thereof. In some aspects, the channel information may depend on at least one of: at least one parameter of a path loss associated with a user equipment (UE), an angle of departure of a signal from the user equipment, an angle of arrival of a signal at a base station, or any combination thereof. In some aspects, the beams may be for neighboring cells and the channel information may include reference signal received power of the beams.

In some aspects, the beams may be used to communicate at least one of: a beam reference signal, a channel state information reference signal, or any combination thereof. In some aspects, the beam reference signal may be communicated during a synchronization sub-frame.

In some implementations, the circuit/module for determining a quantity of beams 2920 of FIG. 29 performs the operations of block 3002. In some implementations, the code for determining a quantity of beams 2930 of FIG. 29 is executed to perform the operations of block 3002.

At block 3004, the apparatus communicates (e.g., transmits or receives) the channel information for the determined quantity of beams. In some aspects, the communication may be beamformed communication.

In some implementations, the circuit/module for communicating 2922 of FIG. 29 performs the operations of block 3004. In some implementations, the code for communicating 2926 of FIG. 29 is executed to perform the operations of block 3004.

Fourteenth Example Process

Figure 31:
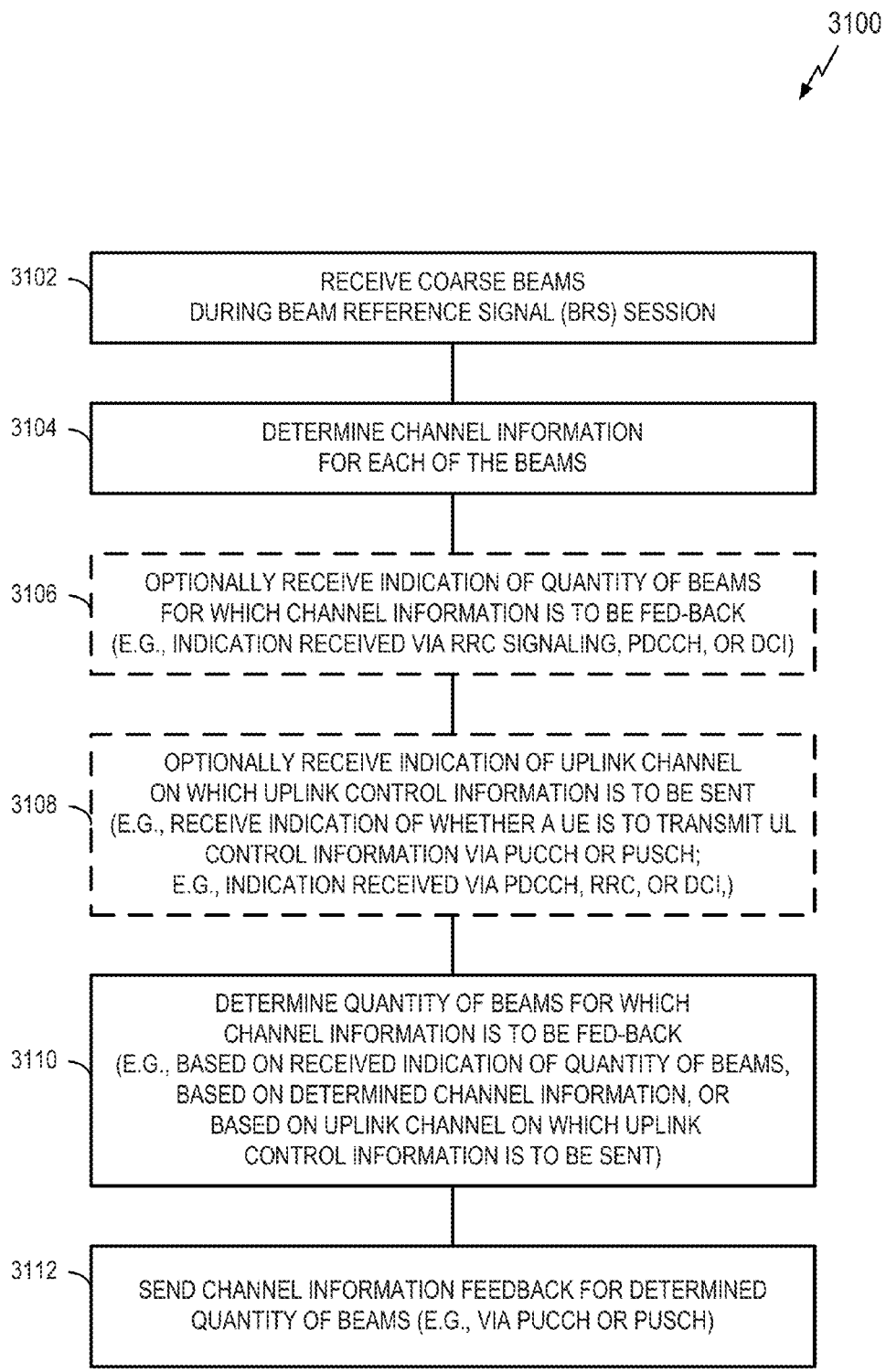
FIG. 31 is a flowchart illustrating an example of a process for sending feedback over a determined number of beams in accordance with some aspects of the disclosure.

FIG. 31 illustrates a process 3100 for BRS communication in accordance with some aspects of the disclosure. In some aspects, the process 3100 may be performed in conjunction with (e.g., as part of or in addition to) the process 3000 of FIG. 30. The process 3100 may take place within a processing circuit (e.g., the processing circuit 2910 of FIG. 29), which may be located in a UE, a BS, or some other suitable apparatus. Of course, in various aspects within the scope of the disclosure, the process 3100 may be implemented by any suitable apparatus capable of supporting communication-related operations.

At block 3102, an apparatus (e.g., a UE) receives coarse beams during a beam reference signal (BRS) session.

In some implementations, the circuit/module for communicating 2922 of FIG. 29 performs the operations of block 3102. In some implementations, the code for communicating 2926 of FIG. 29 is executed to perform the operations of block 3102.

At block 3104, the apparatus determines channel information for each of the beams.

In some implementations, the circuit/module for communicating 2922 of FIG. 29 performs the operations of block 3104. In some implementations, the code for communicating 2926 of FIG. 29 is executed to perform the operations of block 3104.

At optional block 3106, the apparatus may communicate an indication of a quantity of beams for which channel information is to be fed-back. For example, a UE may receive, via a physical downlink control channel (PDCCH), downlink control information (DCI), or radio resource control (RRC) signaling, an indication of the quantity of beams for which channel information is (e.g., is to be) transmitted to the base station. In some aspects, bits may be reserved in downlink control information (DCI) for the indication of the quantity of beams for which channel information is transmitted to the base station.

In some implementations, the circuit/module for communicating 2922 of FIG. 29 performs the operations of block 3106. In some implementations, the code for communicating 2926 of FIG. 29 is executed to perform the operations of block 3106.

At optional block 3108, the apparatus may receive an indication of the uplink channel (e.g., PUCCH or PUSCH) on which uplink control information is to be sent. For example, a UE may receive an indication from a base station via a physical downlink control channel (PDCCH), downlink control information (DCI), or radio resource control (RRC) signaling. In some aspects, the indication may indicate whether a user equipment (UE) is to transmit the uplink control information via the PUCCH or the PUSCH.

In some implementations, the circuit/module for communicating 2922 of FIG. 29 performs the operations of block 3108. In some implementations, the code for communicating 2926 of FIG. 29 is executed to perform the operations of block 3108.

At block 3110, the apparatus determines a quantity of beams for which channel information is to be fed-back. In some aspects, the determination may be based on a received indication of quantity of beams, based on determined channel information, or based on an uplink channel on which uplink control information is to be sent.

In some implementations, the circuit/module for determining a quantity of beams 2920 of FIG. 29 performs the operations of block 3110. In some implementations, the code for determining a quantity of beams 2930 of FIG. 29 is executed to perform the operations of block 3110.

At block 3112, the apparatus sends channel information feedback for the determined quantity of beams. In some aspects, the feedback may be sent via, for example, PUCCH or PUSCH.

In some implementations, the circuit/module for communicating 2922 of FIG. 29 performs the operations of block 3112. In some implementations, the code for communicating 2926 of FIG. 29 is executed to perform the operations of block 3112.

Fifteenth Example Process

Figure 32:
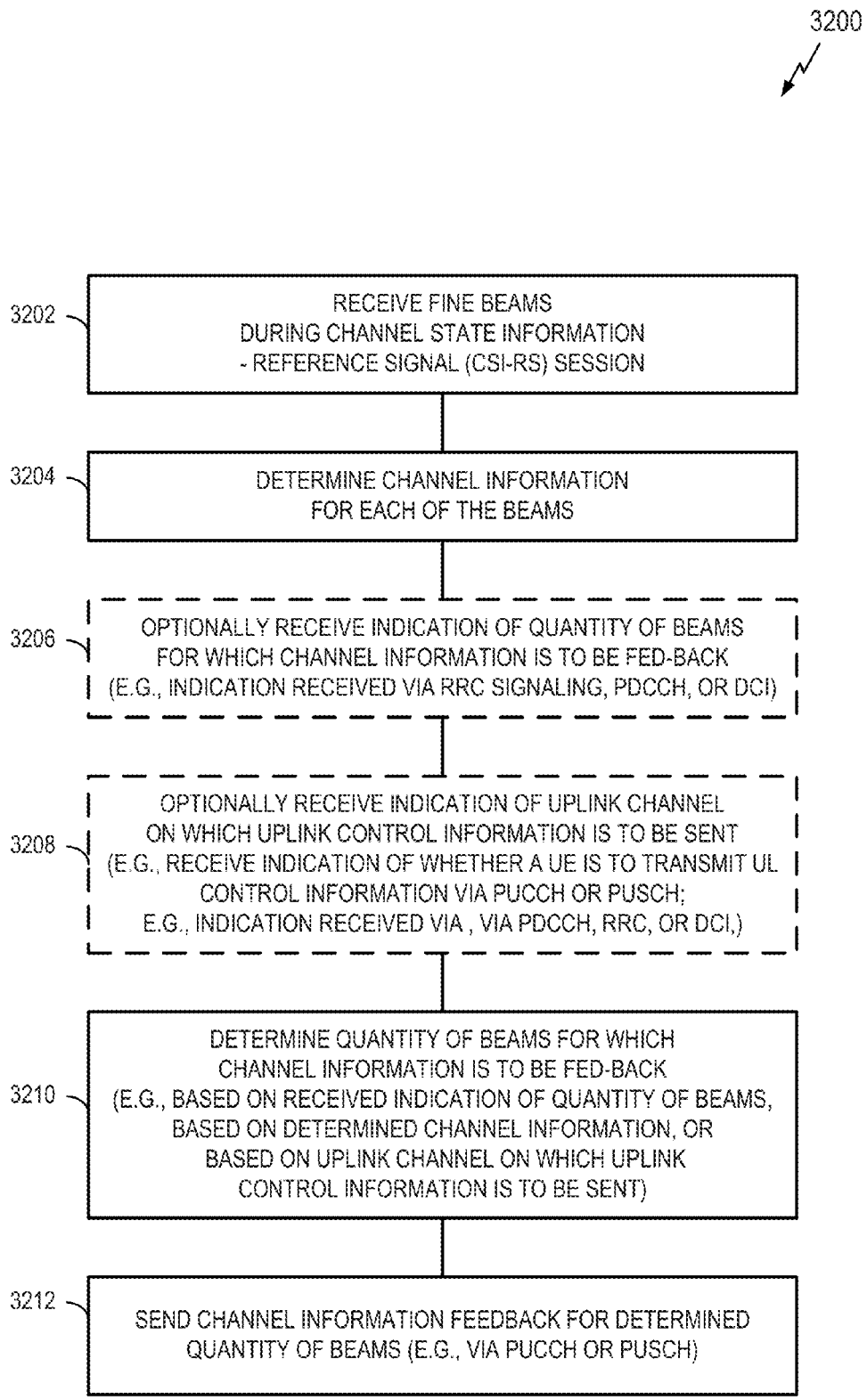
FIG. 32 is a flowchart illustrating an example of another process for sending feedback over a determined number of beams in accordance with some aspects of the disclosure.

FIG. 32 illustrates a process 3200 for CSI-RS communication in accordance with some aspects of the disclosure. In some aspects, the process 3200 may be performed in conjunction with (e.g., as part of or in addition to) the process 3000 of FIG. 30. The process 3200 may take place within a processing circuit (e.g., the processing circuit 2910 of FIG. 29), which may be located in a UE, a BS, or some other suitable apparatus. Of course, in various aspects within the scope of the disclosure, the process 3200 may be implemented by any suitable apparatus capable of supporting communication-related operations.

At block 3202, an apparatus (e.g., a UE) receives fine beams during a channel state information—reference signal (CSI-RS) session.

In some implementations, the circuit/module for communicating 2922 of FIG. 29 performs the operations of block 3202. In some implementations, the code for communicating 2926 of FIG. 29 is executed to perform the operations of block 3202.

At block 3204, the apparatus determines channel information for each of the beams.

In some implementations, the circuit/module for communicating 2922 of FIG. 29 performs the operations of block 3204. In some implementations, the code for communicating 2926 of FIG. 29 is executed to perform the operations of block 3204.

At optional block 3206, the apparatus may communicate an indication of a quantity of beams for which channel information is to be fed-back. For example, a UE may receive, via a physical downlink control channel (PDCCH), downlink control information (DCI), or radio resource control (RRC) signaling, an indication of the quantity of beams for which channel information is (e.g., is to be) transmitted to the base station. In some aspects, bits may be reserved in downlink control information (DCI) for the indication of the quantity of beams for which channel information is transmitted to the base station.

In some implementations, the circuit/module for communicating 2922 of FIG. 29 performs the operations of block 3206. In some implementations, the code for communicating 2926 of FIG. 29 is executed to perform the operations of block 3206.

At optional block 3208, the apparatus may receive an indication of the uplink channel (e.g., PUCCH or PUSCH) on which uplink control information is to be sent. For example, a UE may receive an indication from a base station via a physical downlink control channel (PDCCH), downlink control information (DCI), or radio resource control (RRC) signaling. In some aspects, the indication may indicate whether a user equipment (UE) is to transmit the uplink control information via the PUCCH or the PUSCH.

In some implementations, the circuit/module for communicating 2922 of FIG. 29 performs the operations of block 3208. In some implementations, the code for communicating 2926 of FIG. 29 is executed to perform the operations of block 3208.

At block 3210, the apparatus determines a quantity of beams for which channel information is to be fed-back. In some aspects, the determination may be based on a received indication of quantity of beams, based on determined channel information, or based on an uplink channel on which uplink control information is to be sent.

In some implementations, the circuit/module for determining a quantity of beams 2920 of FIG. 29 performs the operations of block 3210. In some implementations, the code for determining a quantity of beams 2930 of FIG. 29 is executed to perform the operations of block 3210.

At block 3212, the apparatus sends channel information feedback for the determined quantity of beams. In some aspects, the feedback may be sent via, for example, PUCCH or PUSCH.

In some implementations, the circuit/module for communicating 2922 of FIG. 29 performs the operations of block 3212. In some implementations, the code for communicating 2926 of FIG. 29 is executed to perform the operations of block 3212.

Sixteenth Example Process

Figure 33:
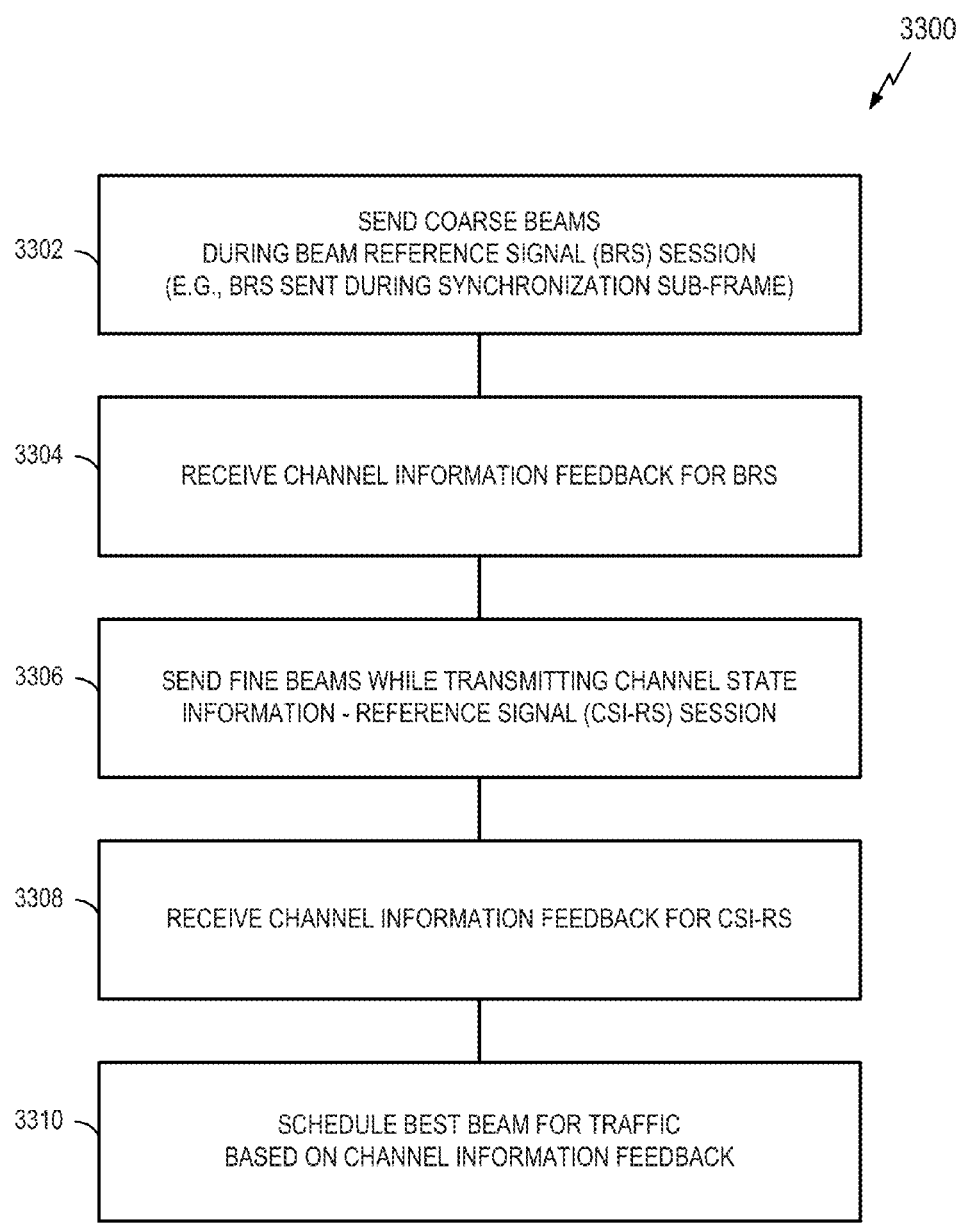
FIG. 33 is a flowchart illustrating an example of a scheduling process in accordance with some aspects of the disclosure.

FIG. 33 illustrates a process 3300 for communication in accordance with some aspects of the disclosure. In some aspects, the process 3300 may be performed in conjunction with (e.g., as part of or in addition to) the process 3000 of FIG. 30. The process 3300 may take place within a processing circuit (e.g., the processing circuit 2910 of FIG. 29), which may be located in a BS, a UE, or some other suitable apparatus. Of course, in various aspects within the scope of the disclosure, the process 3300 may be implemented by any suitable apparatus capable of supporting communication-related operations.

At block 3302, an apparatus (e.g., a BS) sends coarse beams. For example, a BS may send the course beams during a BRS session. The BRS may be sent during a synchronization sub-frame.

In some implementations, the circuit/module for communicating 2922 of FIG. 29 performs the operations of block 3302. In some implementations, the code for communicating 2926 of FIG. 29 is executed to perform the operations of block 3302.

At block 3304, the apparatus receives channel information feedback for BRS.

In some implementations, the circuit/module for communicating 2922 of FIG. 29 performs the operations of block 3304. In some implementations, the code for communicating 2926 of FIG. 29 is executed to perform the operations of block 3304.

At block 3306, the apparatus sends fine beams. For example, a BS may send fine beams while transmitting a CSI-RS session.

In some implementations, the circuit/module for communicating 2922 of FIG. 29 performs the operations of block 3306. In some implementations, the code for communicating 2926 of FIG. 29 is executed to perform the operations of block 3306.

At block 3308, the apparatus receives channel information feedback for CSI-RS.

In some implementations, the circuit/module for communicating 2922 of FIG. 29 performs the operations of block 3308. In some implementations, the code for communicating 2926 of FIG. 29 is executed to perform the operations of block 3308.

At block 3310, the apparatus schedules a best beam based on the channel information feedback.

In some implementations, the circuit/module for communicating 2922 of FIG. 29 performs the operations of block 3310. In some implementations, the code for communicating 2926 of FIG. 29 is executed to perform the operations of block 3310.

Seventeenth Example Process

Figure 34:
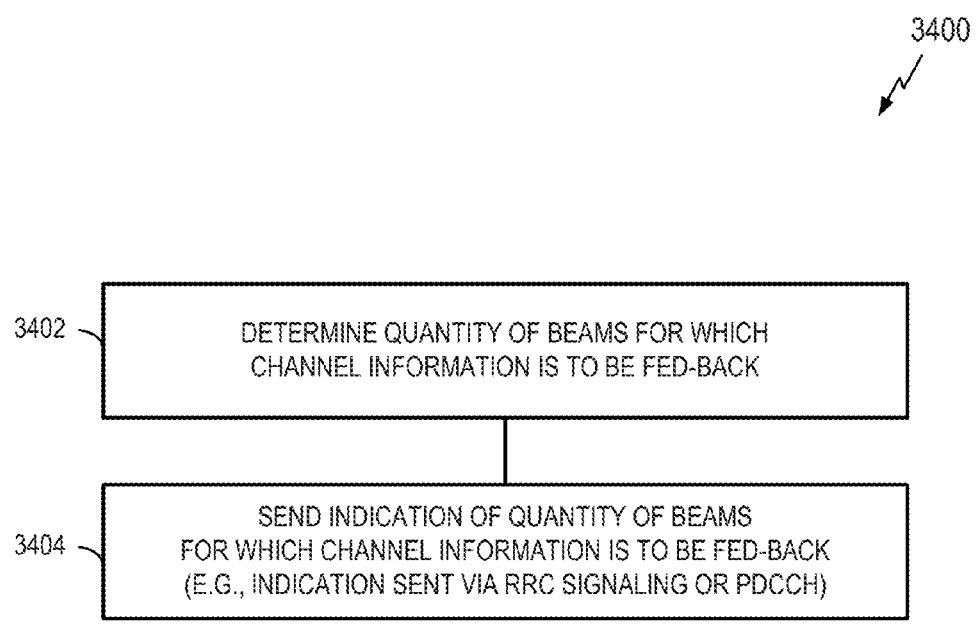
FIG. 34 is a flowchart illustrating an example of another process for specifying a quantity of beams in accordance with some aspects of the disclosure.

FIG. 34 illustrates a process 3400 for communication in accordance with some aspects of the disclosure. In some aspects, the process 3400 may be performed in conjunction with (e.g., as part of or in addition to) the process 3000 of FIG. 30. The process 3400 may take place within a processing circuit (e.g., the processing circuit 2910 of FIG. 29), which may be located in a BS, a UE, or some other suitable apparatus. Of course, in various aspects within the scope of the disclosure, the process 3400 may be implemented by any suitable apparatus capable of supporting communication-related operations.

At block 3402, an apparatus (e.g., a BS) determines a quantity of beams for which channel information is to be fed-back. For example, a BS may make this determination based on which channel is used to send uplink control information, based on link gain, or based on some other factor.

In some implementations, the circuit/module for determining a quantity of beams 2920 of FIG. 29 performs the operations of block 3402. In some implementations, the code for determining a quantity of beams 2930 of FIG. 29 is executed to perform the operations of block 3402.

At block 3404, the apparatus sends an indication of the quantity of beams for which channel information is to be fed-back. For example, a BS may send this indication to a UE.

In some implementations, the circuit/module for communicating 2922 of FIG. 29 performs the operations of block

3404. In some implementations, the code for communicating 2926 of FIG. 29 is executed to perform the operations of block 3404.

Eighteenth Example Process

Figure 35:
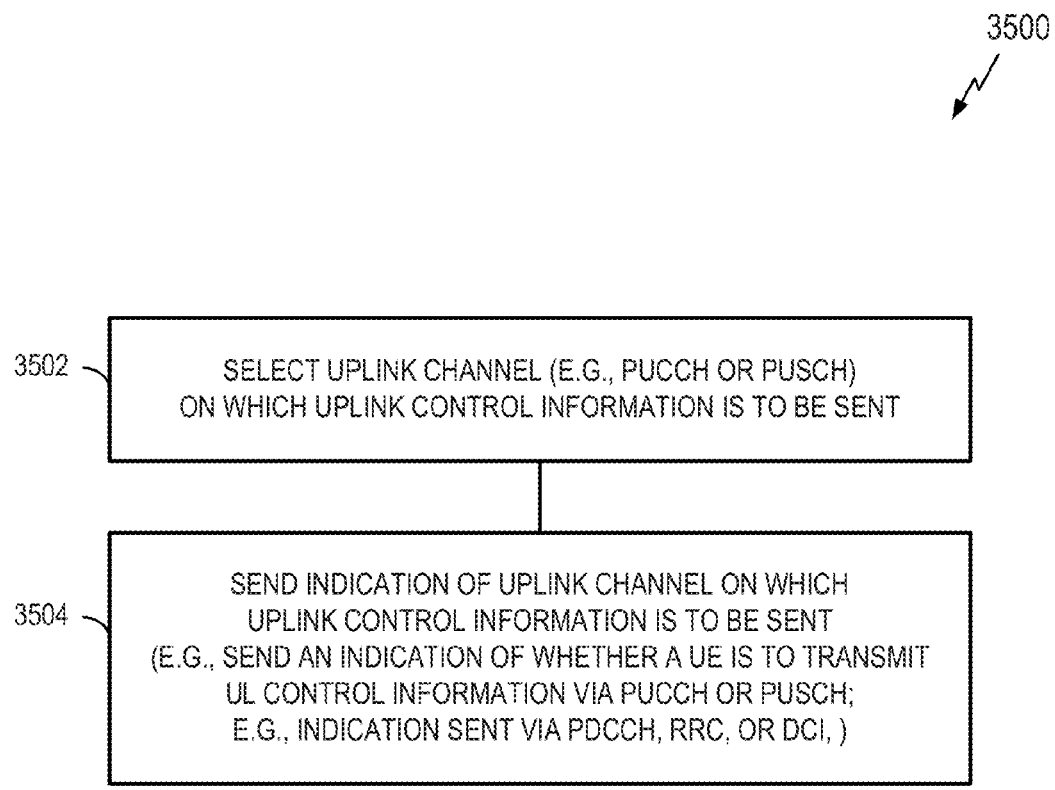
FIG. 35 is a flowchart illustrating an example of a process for selecting a channel in accordance with some aspects of the disclosure.

FIG. 35 illustrates a process 3500 for communication in accordance with some aspects of the disclosure. In some aspects, the process 3500 may be performed in conjunction with (e.g., as part of or in addition to) the process 3000 of FIG. 30. The process 3500 may take place within a processing circuit (e.g., the processing circuit 2910 of FIG. 29), which may be located in a BS, a UE, or some other suitable apparatus. Of course, in various aspects within the scope of the disclosure, the process 3500 may be implemented by any suitable apparatus capable of supporting communication-related operations.

At block 3502, an apparatus (e.g., a BS) selects an UL channel on which control information is to be sent. For example, a BS may select PUCCH or PUSCH.

In some implementations, the circuit/module for communicating 2922 of FIG. 29 performs the operations of block 3502. In some implementations, the code for communicating 2926 of FIG. 29 is executed to perform the operations of block 3502.

At block 3504, the apparatus sends an indication of the UL channel selected at block 3502. For example, a base station may send the indication to a user equipment (UE) via a physical downlink control channel (PDCCH), downlink control information (DCI), or radio resource control (RRC) signaling. In some aspects, the indication may indicate whether the UE is to transmit the uplink control information via the PUCCH or the PUSCH. In some aspects, separate bits may be reserved in downlink control information (DCI) formats to indicate whether the UE is to transmit the uplink control information via the PUCCH or the PUSCH.

In some implementations, the circuit/module for communicating 2922 of FIG. 29 performs the operations of block 3504. In some implementations, the code for communicating 2926 of FIG. 29 is executed to perform the operations of block 3504.

Additional Aspects

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application-specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of a, b, or c" or "one or more of a, b, or c" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of communication, comprising:
   determining a link gain of a user equipment (UE);
   selecting a quantity of uplink control symbols, wherein the selection is based on the link gain of the UE, and wherein the selected quantity of uplink control symbols comprises a first set of symbols and a second set of symbols;
   selecting a frame format from a first frame format and a second frame format based on the selected quantity of uplink control symbols, wherein the first frame format allocates a first quantity of uplink control symbols and the second frame format allocates a second quantity of uplink control symbols, wherein the first quantity is greater than the second quantity;
   selecting a first beam specific to the UE for receiving a sounding reference signal;
   selecting a second beam for receiving uplink control information;
   receiving the sounding reference signal via the first beam during the first set of symbols in a frame having the selected frame format; and
   receiving the uplink control information via the second beam during the second set of symbols in the frame.

2. The method of claim 1, wherein the link gain of the UE depends on a path loss associated with the UE and an angle of arrival of a signal from the UE to a base station.

3. The method of claim 1, wherein the uplink control information comprises at least one of: channel quality information, precoding matrix information, a scheduling request, acknowledgement information, or any combination thereof.

4. The method of claim 1, wherein the uplink control information comprises channel information for different beams.

5. The method of claim 4, wherein the channel information comprises at least one of: a received signal strength indicator, reference signal received power, reference signal received quality, narrowband channel quality information, or any combination thereof.

6. The method of claim 4, wherein:
   the different beams are for neighboring cells; and
   the channel information comprises reference signal received power of the different beams.

7. The method of claim 4, further comprising determining a quantity of the different beams based on the link gain of the UE.

8. The method of claim 4, wherein the different beams are used to communicate at least one of: a beam reference signal, a channel state information reference signal, or any combination thereof.

9. The method of claim 8, further comprising receiving the beam reference signal during a synchronization subframe.

10. The method of claim 1, further comprising:
    sending an indication of the selected quantity of uplink control symbols to the UE.

11. An apparatus for communication, comprising:
    a memory device; and
    a processing circuit coupled to the memory device and configured to:
       determine a link gain of a user equipment (UE);
       select a quantity of uplink control symbols, wherein the selection is based on the link gain of the UE, and wherein the selected quantity of symbols comprises a first set of symbols and a second set of symbols;
       select a frame format from a first frame format and a second frame format based on the selected quantity of uplink control symbols, wherein the first frame format allocates a first quantity of uplink control symbols and the second frame format allocates a second quantity of uplink control symbols, wherein the first quantity is greater than the second quantity;
       select a first beam specific to the UE for receiving a sounding reference signal;
       select a second beam for receiving uplink control information;
       receive the sounding reference signal via the first beam during the first set of symbols in a frame having the selected frame format; and
       receive the uplink control information via the second beam during the second set of symbols in the frame.

12. The apparatus of claim 11, wherein the link gain of the UE depends on a path loss associated with the UE and an angle of arrival of a signal from the UE to a base station.

13. The apparatus of claim 11, wherein the processing circuit is further configured to:

determine symbol locations in the frame based on an identifier of the UE; and receive the uplink control information at the determined symbol locations.

14. The apparatus of claim 11, wherein the processing circuit is further configured to:

determine tone locations in the frame based on an identifier of the UE; and receive the uplink control information at the determined tone locations.

15. The apparatus of claim 11, wherein the processing circuit is further configured to:

determine a quantity of symbols to receive the sounding reference signal based on the link gain of the UE.

* * * * *